US012735620B2

(12) United States Patent
Jones et al.

(10) Patent No.: US 12,735,620 B2
(45) Date of Patent: Sep. 15, 2026

(54) DEFLOCCULATION ADDITIVES FOR WELLBORE SERVICING FLUID ADDITIVES

(71) Applicant: Halliburton Energy Services, Inc., Houston, TX (US)

(72) Inventors: Paul J. Jones, Houston, TX (US); Kyriacos Agapiou, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/953,850

(22) Filed: Nov. 20, 2024

(65) Prior Publication Data

US 2026/0139180 A1 May 21, 2026

(51) Int. Cl.

| | |
|---|---|
| ***C09K 8/467*** | (2006.01) |
| ***C04B 14/06*** | (2006.01) |
| ***C04B 24/02*** | (2006.01) |
| ***C04B 24/18*** | (2006.01) |
| ***C04B 24/32*** | (2006.01) |

(Continued)

(52) U.S. Cl.

CPC .............. *C09K 8/467* (2013.01); *C04B 14/06* (2013.01); *C04B 24/023* (2013.01); *C04B 24/18* (2013.01); *C04B 24/32* (2013.01); *C04B 24/38* (2013.01); *C04B 28/105* (2013.01); *E21B 33/138* (2013.01); *C04B 2103/0079* (2013.01); *C04B 2103/0081* (2013.01); *C04B 2103/0093* (2013.01); *C04B 2103/40* (2013.01)

(58) Field of Classification Search

CPC ....... C09K 8/467; C04B 14/06; C04B 24/023; C04B 24/18; C04B 24/32; C04B 24/38; C04B 28/105; E21B 33/138

See application file for complete search history.

(56) References Cited

U.S. PATENT DOCUMENTS

| | | | |
|---|---|---|---|
| 5,913,364 | A | 6/1999 | Sweatman |
| 6,167,967 | B1 | 1/2001 | Sweatman |

(Continued)

FOREIGN PATENT DOCUMENTS

| | | | |
|---|---|---|---|
| CN | 113772978 | B | 12/2021 |
| EP | 0104795 | A2 | 4/1984 |

(Continued)

OTHER PUBLICATIONS

Foreign Communication from Related Application—International Search Report and Written Opinion of the International Searching Authority, International Application No. PCT/US2024/048294, dated Jan. 2, 2025, 10 pages.

(Continued)

*Primary Examiner* — Crystal J Lee

(74) *Attorney, Agent, or Firm* — Conley Rose, P.C.; Rodney B. Carroll

(57) ABSTRACT

A liquid additive composition comprising a particulate material, an organic carrier fluid, a deflocculant, and optionally a viscosifier and/or a surfactant; wherein the particulate material is substantially insoluble in the organic carrier fluid, and wherein the organic carrier fluid comprises a glycol and/or a glycol ether. A method comprising (a) contacting a particulate material, an organic carrier fluid, a deflocculant, and optionally a viscosifier and/or a surfactant to form a mixture; and (b) agitating the mixture to form the liquid additive composition.

20 Claims, 7 Drawing Sheets

(51) Int. Cl.

| | |
|---|---|
| ***C04B 24/38*** | (2006.01) |
| ***C04B 28/10*** | (2006.01) |
| ***C04B 103/00*** | (2006.01) |
| ***C04B 103/40*** | (2006.01) |
| ***E21B 33/138*** | (2006.01) |

(56) References Cited

U.S. PATENT DOCUMENTS

| | | | | |
|---|---|---|---|---|
| 6,258,757 | B1 | 7/2001 | Sweatman | |
| 6,451,743 | B1 | 9/2002 | Fox | |
| 6,620,769 | B1 | 9/2003 | Juppe | |
| 6,668,929 | B2 | 12/2003 | Griffith | |
| 6,743,756 | B2 | 6/2004 | Harris, Jr. | |
| 7,350,575 | B1 | 4/2008 | Lewis | |
| 7,740,070 | B2 | 6/2010 | Santra | |
| 7,790,774 | B1 | 9/2010 | Kinsey, III | |
| 9,120,918 | B2 | 9/2015 | Soddemann | |
| 10,737,978 | B2 | 8/2020 | Lewis | |
| 10,982,127 | B2 | 4/2021 | Sodhi | |
| 11,124,452 | B2 | 9/2021 | Lewis | |
| 11,680,199 | B2 | 6/2023 | Jones | |
| 11,859,123 | B2 | 1/2024 | Jadhav | |
| 11,920,069 | B2 | 3/2024 | Semyonov | |
| 11,932,804 | B2 | 3/2024 | Jain | |
| 11,987,743 | B2 | 5/2024 | Jain | |
| 2002/0193256 | A1 | 12/2002 | Harris | |
| 2003/0181532 | A1 | 9/2003 | Parris | |
| 2007/0122331 | A1 | 5/2007 | Amirzadeh-Asl | |
| 2008/0017376 | A1 | 1/2008 | Badalamenti | |
| 2008/0169100 | A1 | 7/2008 | Lewis et al. | |
| 2008/0171673 | A1 | 7/2008 | Lewis | |
| 2009/0197991 | A1 | 8/2009 | Bury et al. | |
| 2012/0152540 | A1 | 6/2012 | Patil | |
| 2013/0081934 | A1 | 4/2013 | New | |
| 2013/0274150 | A1 | 10/2013 | Holt et al. | |
| 2014/0076561 | A1 | 3/2014 | Reddy | |
| 2014/0090843 | A1 | 4/2014 | Boul | |
| 2014/0166285 | A1 | 6/2014 | Santra | |
| 2014/0318786 | A1 | 10/2014 | Vidma | |
| 2014/0326452 | A1 | 11/2014 | Loiseau | |
| 2015/0072902 | A1 | 3/2015 | Lafitte | |
| 2016/0060500 | A1* | 3/2016 | Kefi | C09K 8/52 507/261 |
| 2016/0160109 | A1 | 6/2016 | Patil | |
| 2016/0264838 | A1 | 9/2016 | Nelson | |
| 2016/0264842 | A1 | 9/2016 | Miller | |
| 2017/0130115 | A1* | 5/2017 | Ballard | C09K 8/428 |
| 2020/0407620 | A1 | 12/2020 | Wagle et al. | |
| 2021/0101833 | A1 | 4/2021 | Thaemlitz | |
| 2021/0355366 | A1 | 11/2021 | Jadhav | |
| 2022/0363972 | A1* | 11/2022 | Jones | C04B 14/06 |
| 2023/0019738 | A1 | 1/2023 | Abdulrazzaq et al. | |
| 2024/0018408 | A1 | 1/2024 | Jain | |
| 2024/0158686 | A1 | 5/2024 | Jain | |

FOREIGN PATENT DOCUMENTS

| | | | | |
|---|---|---|---|---|
| EP | 1348832 | A1 | 10/2003 | |
| EP | 3814448 | A1 | 5/2021 | |
| WO | 2007074330 | A1 | 7/2007 | |
| WO | 2007132212 | A2 | 11/2007 | |
| WO | 2008084193 | A2 | 7/2008 | |
| WO | 2014167375 | A1 | 10/2014 | |
| WO | 2016154363 | A1 | 9/2016 | |
| WO | 2018160253 | A1 | 7/2018 | |
| WO | 2020005736 | A1 | 1/2020 | |
| WO | WO-2020209831 | A1 * | 10/2020 | C09K 8/487 |
| WO | 2021230954 | A1 | 11/2021 | |
| WO | 2022240458 | A1 | 11/2022 | |

OTHER PUBLICATIONS

Filing Receipt, Specification and Drawings for U.S. Appl. No. 18/545,641, filed Dec. 19, 2023, entitled "Methods of Servicing a Wellbore With Compositions Comprising a Suspension of Metal Oxide and a Salt Solution," 80 pages.

Foreign Communication from Related Application—International Search Report and Written Opinion of the International Searching Authority, International Application No. PCT/US2022/015171, dated May 24, 2022, 10 pages.

Office Action dated Jun. 13, 2022 (22 pages), U.S. Appl. No. 17/188,524, filed Mar. 1, 2021.

Foreign Communication from Related Application-International Search Report and Written Opinion of the International Searching Authority, International Application No. PCT/US2021/020507, dated Jun. 21, 2021, 11 pages.

Electronic Acknowledgment Receipt, Specification and Drawings for International Application No. PCT/US2021/0020507, entitled "A Wellbore Servicing Fluid and Methods of Making and Using Same," filed Mar. 2, 2021, 70 pages.

Filing Receipt, Specification and Drawings for U.S. Appl. No. 63/025,702, entitled "Wellbore Servicing Fluid and Methods of Making and Using Same," filed May 15, 2020, 53 pages.

Thwala, Justice M. et al., "Rheological Studies of Stability of Colloidal Silica Particles Dispersed in Monoethylene Glycol (MEG) Stabilized by Dodecyl Hexa Ethylene Glycol Monoether (CI2E6)," Langmuir, Jul. 23, 2009, vol. 25, No. 22, pp. 12926-12936, Amer••can Chemical Society.

Electronic Acknowledgment Receipt, Specification and Drawings for International Application No. PCT/US2022/15171, entitled "A Wellbore Servicing Fluid and Methods of Making and Using Same," filed Feb. 4, 2022, 55 pages.

Office Action dated Jan. 21, 2022 (21 pages), U.S. Appl. No. 17/188,524, filed Mar. 1, 2021.Filing Receipt, Specification and Drawings for U.S. Appl. No. 17/188,524 entitled "Wellbore Servicing Fluid and Methods of Making and Using Same," filed Mar. 1, 2021, 84 pages.

Filing Receipt, Specification and Drawings for U.S. Appl. No. 63/188,700, entitled "Wellbore Servicing Fluid and Methods of Making and Using Same," filed May 14, 2021, 63 pages.

Foreign Communication from Related Application-International Search Report and Written Opinion of the International Searching Authority, International Application No. PCT/US2019/026362, dated Jan. 6, 2020, 11 pages.

Office Action dated Jul. 15, 2025 (31 pages), U.S. Appl. No. 18/545,641, filed Dec. 19, 2023.

Foreign Communication from Related Application—International Search Report and Written Opinion of the International Searching Authority, International Application No. PCT/US2024/059605, dated Aug. 12, 2025 10 pages.

* cited by examiner

DEFLOCCULATION ADDITIVES FOR WELLBORE SERVICING FLUID ADDITIVES

BACKGROUND

This disclosure relates to compositions and methods of servicing a wellbore. More specifically, it relates to wellbore servicing fluid compositions and methods of using same during servicing a wellbore penetrating a subterranean formation.

Natural resources such as gas, oil, and water residing in a subterranean formation or zone are usually recovered by drilling a wellbore down to the subterranean formation while circulating a drilling fluid in the wellbore. The drilling fluid is usually circulated downward through an interior of a drill pipe and upward through an annulus, which is located between the exterior of the drill pipe and the interior wall of the wellbore. After terminating the circulation of the drilling fluid, a string of pipe, e.g., casing, is run in the wellbore. Next, a train of fluids, including a spacer or an efficiency fluid, can be placed though the interior of the pipe and upward into the annulus to displace a portion of the existing fluid in the annulus, in order to separate the drilling fluid from the cementing fluid and prepare the wellbore to receive the cementing fluid. After that, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing.

Offshore oil and gas production is usually more challenging than land-based onshore oil and gas production due to remote and harsher environment. Offshore drilling, completion, workover, and production operations are typically conducted from a drilling rig located on an offshore platform that is bottom-founded or floating. A bottom-founded platform extends from the seafloor upwardly to a deck located above the surface of the water, and at least a portion of the weight of the platform is supported by the seafloor. A floating platform is a ship, vessel, or another structure such as a tension-leg platform, in which the weight of the platform is supported by water buoyancy. Both of the two types of the offshore platforms may have constraints for equipment/tools due to offshore conditions (e.g., limited space, motion) and may need special equipment/tools, compared to an onshore wellbore. In addition, offshore drilling, completion, workover, and production operations present more environmental challenges than those operations onshore, from the produced hydrocarbons and the materials used during the operations.

Generally, magnesium oxide (MgO) can be added to a cement slurry to achieve post set expansion of the cement after placement in a well. MgO is conventionally added as a powder to the cement dry powder blend in the bulk plant and transported to location. For land cementing operations, the cement dry powder blend may be created for a specific job containing dry additives at the required concentrations. On location, the cement dry powder blend and mix water can be combined in the recirculating cement mixer or batch mixer before going down hole. However, in offshore cementing operations limitations in the offshore rig's silo storage capacity limits the number of dry cement blends to be sent to the rig, and liquid additives are added to the mix water either through a chemical mixing system (CMS) or by batch mixing. When MgO is used in an offshore application, it is usually added as a dry powder to the entire dry blend sent offshore. This leads to excess material in the cement dry powder blend that may or may not be necessary for all of operations that will be carried out using the cement dry powder blend, leading to unnecessary complexity, increased material costs and reduced asset value.

Thus, an ongoing need exists for a wellbore servicing fluid and methods of making and using same at a location having limited equipment/tools/space (e.g., an offshore platform), while reducing environmental impacts.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
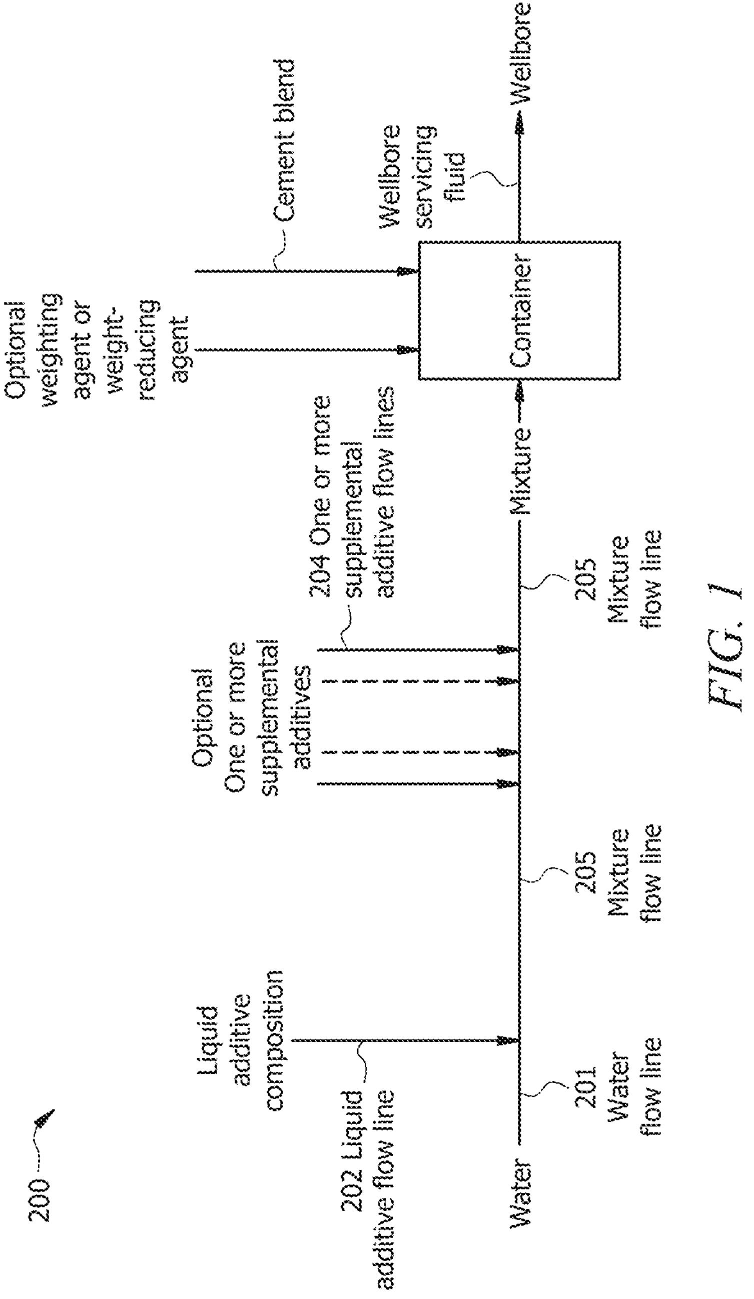
FIG. 1 is a process flow diagram according to some embodiments of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. It is to be understood that "subterranean formation" encompasses both areas below exposed earth and areas below earth covered by water such as ocean or fresh water.

Particulate (e.g., calcined MgO) suspensions in glycol based fluids can experience flocculation over time as a result of electrostatic forces between the suspended (e.g., MgO) particles. In concentrated suspensions, this can manifest as the development of strong gels over a period of time. Gels may hinder chemical transfers using surface equipment. In severe cases of gelation material may be rendered unusable. It has been unexpectedly discovered that lignosulfonates or alternatives thereto noted hereinbelow can act as deflocculation agents (also referred to herein as "deflocculants" or "deflocculation additives") when added to suspensions of particulates (e.g., calcined MgO) in organic (e.g., glycol based) fluids to reduce viscosity and help inhibit the formation of gels during storage. The deflocculant can be added during original production of the liquid additive composition of this disclosure or can be mixed (e.g., homogenized) into the suspension after original production to reduce gelation of the material and prevent future gel formation.

Disclosed herein are liquid additive compositions for use in wellbore servicing operations. The liquid additive compositions as disclosed herein may comprise a particulate material, an organic carrier fluid, a deflocculant (also referred to as an "anti-flocculation agent"), and optionally a viscosifier and/or a surfactant (for example, an alcohol alkoxylate surfactant); wherein the particulate material is substantially insoluble in the organic carrier fluid, and wherein the organic carrier fluid comprises a glycol and/or a glycol ether. In embodiments, as described further hereinbelow, the particulate material can comprise a water-interactive material and/or a water-insoluble material. In embodiments, the deflocculant is selected from lignosulfonates (also referred to as "lignin sulfonates"), sulfonated naphthalene condensates, sulfonated acetone formaldehyde condensates (SAFCs), polyphosphates, polycarboxylate ethers, aminophosphonates, aminophosphonic acids, or combinations thereof. In embodiments, the viscosifer comprises diutan alone or in combination with amorphous silica.

Also disclosed herein are methods and compositions for making and using a wellbore servicing fluid, more specifically, a wellbore servicing fluid comprising the liquid additive composition. In embodiments, a wellbore servicing fluid of the type disclosed herein can be a cementitious fluid or cement slurry, and can be used for cementing a wellbore penetrating a subterranean formation.

Further disclosed herein are methods of preparing a liquid additive composition, methods of preparing a wellbore servicing fluid comprising the liquid additive composition, and methods of servicing a wellbore (e.g., cementing) by placing the wellbore servicing fluid comprising the liquid additive composition into the wellbore.

In embodiments, the wellbore servicing fluid can be a cementitious fluid, wherein the cementitious fluid comprises the liquid additive composition, water, and a cement blend.

In embodiments, the liquid additive composition can comprise a particulate material, an organic carrier fluid, a deflocculant, and optionally a viscosifier and/or a surfactant (for example, an alcohol alkoxylate surfactant). In embodiments, the liquid additive composition is a substantially homogenous mixture (e.g., a suspension) in which the particulate material does not dissolve, but gets uniformly suspended throughout the bulk of an organic carrier fluid. For example, the particulate material can be uniformly dispersed (e.g., floating around freely) in the liquid additive composition. A discontinuous internal phase (e.g., particulate material) of the liquid additive composition can be uniformly dispersed throughout a continuous external phase (e.g., organic carrier fluid) of the in 5 homogenous liquid additive composition through preparation (e.g., mixing or blending), optionally with the use of a viscosifying suspending agent (e.g., a viscosifier, such as diutan alone or in combination with amorphous silica). The liquid additive composition may be prepared by mixing or blending the components of the liquid additive composition to form the homogenous suspension. When used in conjunction with a cementitious wellbore servicing fluid, the liquid additive composition can function to mitigate cement shrinkage (e.g., prevent or decrease the extent of cement shrinkage).

The particulate material can be substantially insoluble in the organic carrier fluid. In embodiments, the particulate material can be characterized by a solubility in the organic carrier fluid of less than about 100 mmol/L, alternatively less than about 50 mmol/L, alternatively less than about 25 mmol/L, alternatively less than about 10 mmol/L, alternatively less than about 1 mmol/L, alternatively less than about 0.1 mmol/L, alternatively less than about 0.01 mmol/L, or alternatively less than about 0.001 mmol/L. The particulate material can comprise a water-interactive material and/or a water-insoluble material. While the current disclosure is discussed in detail in the context of the liquid additive composition comprising a water-interactive material and/or a water-insoluble material, it should be understood that any material that is substantially insoluble in the organic carrier fluid may be used as the particulate material in the liquid additive composition.

In embodiments, the particulate material can comprise a water-interactive material. While the water-interactive material is substantially insoluble in the organic carrier fluid, the water-interactive material may react with water and/or be water soluble. For example, the water-interactive material can be substantially insoluble in the organic carrier fluid (e.g., characterized by a solubility in the organic carrier fluid of less than about 10 mmol/L) and can be soluble in water (e.g., characterized by a solubility in water of equal to or greater than about 10 mmol/L, alternatively equal to or greater than about 100 mmol/L, or alternatively equal to or greater than about 1 mol/L). As another example, the water-interactive material can be substantially insoluble in the organic carrier fluid (e.g., characterized by a solubility in the organic carrier fluid of less than about 10 mmol/L) and can interact with water, whereby the water-interactive material is consumed once in contact with water (e.g., by dissolution in water; by reacting with water and/or aqueous solution components, e.g., of the water based cement wellbore servicing fluids described hereinbelow). Liquid additive compositions as disclosed herein comprising a particulate material comprising a water-interactive material enable suspending the water-interactive material in aqueous-compatible suspensions, when the formation of water suspensions is not feasible owing to the intrinsic material properties of the particulate material with respect to water. For example, attempting to form aqueous suspensions of water-interactive materials can significantly and undesirably increase the viscosity of the aqueous suspension, thereby undesirably limiting the aqueous suspensions to relatively low concentrations of water-interactive material.

In embodiments, the water-interactive material may comprise an expansion agent, a viscosifying clay, a delayed viscosifier, a fluid loss agent, and the like, or combinations thereof.

The expansion agents may comprise inorganic oxides, alkali metal oxides, alkaline earth metal oxides, metal powders, inorganic silicates, and the like, or combinations thereof. For example, the expansion agents may comprise magnesium oxide, non-calcined magnesium oxide, calcined magnesium oxide, lightly burned magnesium oxide, hard burned magnesium oxide, dead burned magnesium oxide, calcium oxide, aluminum powder, a gypsum blend (e.g., a calcium aluminate/calcium sulfate blend), magnesium iron silicate, olivine, aluminum powder, magnesium powder, iron powder, zinc powder, and the like, or combinations thereof. Expansion agents can provide for a bulk volumetric increase of a composition, for example a cementitious composition comprising an expansion agent may exhibit a bulk volumetric increase upon setting. For example, an expansion agent may be any material that enables a gas to become incorporated into the cement composition. As another example, an expansion agent may be any material or materials that reacts with water to yield a product with a volume greater than the individual reactants. As yet another example, an expansion agent comprising a gypsum blend is commercially available as MICROBOND™ expanding additive from Halliburton Energy Services, Inc. In addition, examples of expansion agents comprising dead burned magnesium oxide are commercially available as MICROBOND™ M expanding additive and MICROBOND™ HT expanding additive from Halliburton Energy Services, Inc.

In embodiments, the particulate material comprises inorganic oxides, alkali metal oxides, alkaline earth metal oxides, magnesium oxide, non-calcined magnesium oxide, calcined magnesium oxide, lightly burned magnesium oxide, hard burned magnesium oxide, dead burned magnesium oxide, calcium oxide, and the like, or combinations thereof.

In embodiments, the particulate material comprises an expansion agent such as magnesium oxide (MgO), non-calcined magnesium oxide, calcined magnesium oxide, lightly burned magnesium oxide, hard burned magnesium oxide, dead burned magnesium oxide, and the like, or combinations thereof. MgO may be substituted in the liquid additive compositions as disclosed herein by other expansion agents that may yield lower density, higher volume species upon hydration in an aqueous medium; nonlimiting examples of which include inorganic oxides (e.g., calcium oxide). In some embodiments, the particulate material comprises magnesium oxide. In other embodiments, the particulate material comprises calcium oxide. In yet other embodiments, the particulate material comprises both calcium oxide and magnesium oxide.

In still yet other embodiments, the MgO may be substituted in the liquid additive compositions as disclosed herein by latent expansive compounds, including compounds of a mineral nature, that may give rise to lower density, higher volume products upon hydration; nonlimiting examples of which include inorganic silicates, such as magnesium iron silicate (e.g., olivine).

In still yet other embodiments, the MgO may be substituted in the liquid additive compositions as disclosed herein by reactive species that evolve gases upon reaction with an alkali medium and thereby contribute to volumetric expansion in cement slurry or other fluid; nonlimiting examples of which include inorganic metal powders such as powders of aluminum, magnesium, iron, zinc, and the like, or combinations thereof.

In still yet other embodiments, the MgO may be substituted in the liquid additive compositions as disclosed herein by an ettringite precursor, ettringite, calcium aluminum sulfate, hydrous calcium aluminum sulfate, a calcium aluminate mixture, a calcium aluminate cement (CAC) and calcium sulfate mixture, a gypsum blend (e.g., a calcium aluminate/calcium sulfate blend), and the like, or combinations thereof.

Although the viscosifying clay and the delayed viscosifier can be viscosifiers for aqueous solutions, they may not substantially increase the viscosity of the organic liquid additive composition disclosed herein. The liquid additive composition acts as a carrier for the particulate material. The viscosifying clay and/or the delayed viscosifier may increase the viscosity of a wellbore servicing fluid, such as a cementitious fluid. The viscosifying clay may comprise bentonite, sepiolite, hectorite, and the like, or combinations thereof. The delayed viscosifier may comprise crosslinked materials, such as crosslinked guar, crosslinked vinyl alcohols, crosslinked acrylamide polymers, and the like, or combinations thereof.

The fluid loss agent may comprise an acrylic-based polymer, a polyacrylate, an acrylamide-based polymer, a polyacrylamide, an acrylamide copolymer, an acrylic acid copolymer, a polymer of acrylamide-tertiary-butyl sulfonate (ATBS), an ATBS/acrylamide copolymer, 2-acrylamido-2-methylpropane sulfonic acid/acrylamide copolymers, 2-acrylamido-2-methylpropane sulfonic acid/N,N-dimethylacrylamide copolymers, vinylpyrrolidone/2-acrylamido-2-methylpropane sulfonic acid/acrylamide terpolymers, acrylamide/t-butyl acrylate/N-vinylpyrrolidone terpolymers, acrylamide/t-butyl acrylate/2-acrylamido-2-methylpropane sulfonic acid terpolymers, 2-acrylamido-2-methylpropane sulfonic acid/N-N-dimethylacrylamide/acrylamide terpolymers, acrylamide/t-butyl acrylate/N-vinylpyrrolidone/2-acrylamido-2-methylpropane sulfonic acid tetrapolymers, acrylamide/t-butyl acrylate copolymers, poly(2-hydroxyethyl methacrylate), poly(2-hydroxypropyl methacrylate), derivatives thereof, and the like, or combinations thereof. Generally, a fluid loss agent may control the loss of fluid to a wellbore and/or subterranean formation.

In embodiments, the particulate material may comprise a water-insoluble material; such as pozzolana cement, sand, a weighting agent (e.g., an iron oxide, such as hematite; a manganese oxide, such as hausmannite; a titanium-iron oxide, such as ilmenite, etc.), a fiber (e.g., carbon fiber, acrylonitrile fiber, polypropylene fiber, rubber fiber, glass fiber, etc.), a rubber particle; a hollow glass sphere; a hollow pozzolanic sphere; a glass bubble; a glass ball; a ceramic ball; graphite; pozzolan; pumice; trass; clay; calcined clay; silica, fume silica, amorphous silica, micro-sized silica, nano-sized silica; and the like; or combinations thereof. A weighting agent can increase a density of a fluid. Fibers suitable for use as particulate material in the present disclosure can be further characterized by any suitable aspect ratio. The aspect ratio of a fiber may be calculated by dividing the length of the fiber by the diameter of the fiber. For example, fibers suitable for use as a particulate material as disclosed herein may be characterized by an aspect ratio of equal to or greater than about 2:1, alternatively equal to or greater than about 5:1, or alternatively equal to or greater than about 10:1.

In embodiments where the particulate material comprises a water-insoluble material, the liquid additive composition as disclosed herein does not require the use of a biocide (although a biocide may be used), while an aqueous suspension comprising the water-insoluble material would necessitate the use of a biocide to mitigate shelf life issues due to degradation of the aqueous suspension over time. Organic carrier fluids as disclosed herein may be biocidic when largely water-free.

The liquid additive composition (and/or a wellbore servicing fluid of the type disclosed hereinbelow and comprising the liquid additive composition) can exclude a biocide. In embodiments, the liquid additive composition and/or the wellbore servicing fluid comprising same comprises equal to or less than about 1%, 0.1%, 0.001%, 0.0001%, 0.00001%, 0.000001%, or 0.0000001% biocide based on the total weight of the liquid additive composition and/or the wellbore servicing fluid, respectively.

In embodiments, the particulate material can be characterized by a particle size of from about 1 nm to about 10,000 μm, alternatively from about 10 nm to about 9,000 μm, alternatively from about 10 nm to about 1,000 μm, alternatively from about 0.1 μm to about 7,500 μm, alternatively from about 0.5 μm to about 5,000 μm, alternatively from about 0.1 μm to about 1,000 μm, alternatively from about 0.1 μm to about 500 μm, alternatively from about 0.1 μm to about 250 μm, alternatively from about 1 μm to about 100 μm, alternatively from about 2 μm to about 50 μm, or alternatively from about 10 μm to about 25 μm. For purposes of the disclosure herein, the particle size refers to the largest dimension of any two-dimensional cross section through the particle. Nonlimiting examples of particulate material shapes suitable for use in the present disclosure include cylindrical, discoidal, spherical, tabular, ellipsoidal, equant, irregular, cubic, acicular, angular, and the like, or combinations thereof.

In embodiments, the particulate material can be characterized by a particle size of from about 0.1 μm to about 250 μm, alternatively from about 1 μm to about 100 μm, alternatively from about 2 μm to about 50 μm, or alternatively from about 10 μm to about 25 μm. In some embodiments, the particulate material is characterized by an angular and/or acicular shape. In other embodiments, the particulate material is characterized by a spherical shape. In yet other embodiments, the particulate material is characterized by a spherical shape, angular shape, acicular shape, or combinations thereof. For example, the particulate material may comprise any suitable combination of spherical shape particles, angular shape particles, acicular shape particles, and the like.

In embodiments, a particulate material suitable for use in the present disclosure may have a particle size in the range of from about 60 to about 1,250 mesh, alternatively from about 80 to about 625 mesh, or alternatively from about 140 to about 400 mesh, U.S. Sieve Series.

In some embodiments, a particulate material suitable for use in the present disclosure may have a particle size of about 325 mesh, U.S. Sieve Series. The particulate material may be characterized by having substantially all of the particles pass through a 325 mesh screen, U.S. Sieve Series. The particulate material may be characterized by having a majority (e.g., greater than about 50 wt. %, alternatively greater than about 75 wt. %, alternatively greater than about 90 wt. %, alternatively greater than about 95 wt. %, or alternatively greater than about 99 wt. %, based on a total weight of the particulate material) of the particles pass through a 325 mesh screen, U.S. Sieve Series; although some particles (e.g., less than about 50 wt. %, alternatively less than about 25 wt. %, alternatively less than about 10 wt. %, alternatively less than about 5 wt. %, or alternatively less than about 1 wt. %, based on a total weight of the particulate material) may not pass through the 325 mesh screen, U.S. Sieve Series.

In embodiments, the particulate material can comprise magnesium oxide characterized by a particle size in a range of from about 2 μm to about 60 μm, in a range of from about 5 μm to about 45 μm, or alternatively in a range of from about 10 μm to about 25 μm. In such embodiments, the particulate material may be characterized by an angular shape. The magnesium oxide may be a burnt type of magnesium oxide, such as lightly burned magnesium oxide, hard burned magnesium oxide, dead burned magnesium oxide, and the like, or combinations thereof.

In embodiments, the particulate material can be present in the liquid additive composition in an amount of from about 1 wt. % to about 80 wt. %, alternatively from about 1 wt. % to about 70 wt. %, alternatively from about 1 wt. % to about 60 wt. %, alternatively from about 1 wt. % to about 50 wt. %, alternatively from about 5 wt. % to about 40 wt. %, alternatively from about 10 wt. % to about 30 wt. %, alternatively from about 10 wt. % to about 80 wt. %, alternatively from about 20 wt. % to about 70 wt. %, alternatively from about 30 wt. % to about 60 wt. %, or alternatively from about 40 wt. % to about 55 wt. %, based on a total weight of the liquid additive composition.

In some embodiments, the particulate material can comprise magnesium oxide, wherein the magnesium oxide can be present in the liquid additive composition in an amount of from about 40 wt. % to about 75 wt. %, alternatively from about 40 wt. % to about 74.5 wt. %, alternatively from about 40 wt. % to about 70 wt. %, alternatively from about 40 wt. % to about 60 wt. %, or alternatively from about 45 wt. % to about 55 wt. %, based on a total weight of the liquid additive composition.

The organic carrier fluid may comprise a glycol and/or a glycol ether. Glycols suitable for use in the present disclosure may comprise an alkylene glycol, monoethylene glycol (MEG, also known as ethylene glycol), propylene glycol, butylene glycol, polyalkylene glycol, polyethylene glycol, polypropylene glycol, polybutylene glycol, and the like, or combinations thereof. Generally, when substantially water-free, glycols may be biocidic, and consequently the use of a biocide in the liquid additive composition may be unnecessary. Glycol ethers suitable for use in the present disclosure may comprise methyl ethers and/or ethyl ethers of the glycols that are suitable for use as organic carrier fluid as disclosed herein. For example, glycol ethers suitable for use in the present disclosure may comprise ethylene glycol monomethyl ether, ethylene glycol monoethyl ether, propylene glycol monomethyl ether, propylene glycol monoethyl ether, butylene glycol monomethyl ether, butylene glycol monoethyl ether, and the like, or combinations thereof. The glycol and/or a glycol ether that are suitable for use as organic carrier fluid in the suspension compositions as disclosed herein may degrade within a few weeks upon contacting seawater.

The organic carrier fluid may be substantially water-free. However, the organic carrier fluid may contain trace amounts of water (e.g., from manufacturing process, atmospheric moisture, etc.). For example, the organic carrier fluid may contain less than about 1 wt. %, alternatively less than about 0.1 wt. %, alternatively less than about 0.01 wt. %, alternatively less than about 0.001 wt. %, or alternatively less than about 0.0001 wt. % water, based on a total weight of the organic carrier fluid. The lack of elevated water content in the organic carrier fluid may prevent hydration (e.g., significant hydration) of the particulate material (e.g., magnesium oxide).

The organic carrier fluid can be water miscible. As opposed to an oil (e.g., oleaginous fluid), the organic carrier fluids as disclosed herein are water miscible, such that a compatibilizer-type material (e.g., a surfactant such as or other than the alcohol alkoxylate surfactant of the liquid additive composition) may not be needed in order to be able to homogenously mix the liquid additive composition with an aqueous fluid (e.g., an aqueous wellbore servicing fluid). Further, in certain applications, an oleaginous fluid may be undesirable.

In embodiments, the organic carrier fluid comprises MEG. MEG, also referred to as ethylene glycol, is an organic compound characterized by the formula $(CH_2OH)_2$. Pure MEG is an odorless and colorless liquid at room temperature and is miscible in water. MEG biodegrades relatively quickly in soil (e.g., half-life of about 2-12 days), surface water (e.g., half-life of about 2-12 days), and ground water (e.g., half-life of about 4-24 days). MEG can be used as an organic carrier fluid in the liquid additive composition and can degrade within a few weeks upon contacting seawater.

In embodiments, the organic carrier fluid can be present in the liquid additive composition in an amount of from about 20 wt. % to about 90 wt. %, alternatively, from about 20 wt. % to about 89.8 wt. %, alternatively from about 25 wt. % to about 80 wt. %, alternatively from about 25 wt. % to about 70 wt. %, alternatively from about 25 wt. % to about 60 wt. %, alternatively from about 30 wt. % to about 60 wt. %, alternatively from about 40 wt. % to about 60 wt. %, or alternatively from about 45 wt. % to about 55 wt. %, based on a total weight of the liquid additive composition.

In embodiments, MEG can be present in the liquid additive composition in an amount of from about 40 wt. % to about 60 wt. %, or alternatively from about 42.5 wt. % to about 57.5 wt. %, or alternatively from about 45 wt. % to about 55 wt. %, based on a total weight of the liquid additive composition.

The liquid additive composition comprises a deflocculant. The deflocculant can have the ability to migrate to the surface of the particulate and create a barrier/impediment to particulate agglomeration, thus reducing or preventing the formation of agglomerates or gels. The deflocculant can comprise at least one of a lignosulfonate (or "lignin sulfonate"), a sulfonated naphthalene condensate, a sulfonated acetone formaldehyde condensate (SAFC), a polyphosphate, an aminophosphonate, aminophosphonic acids, and combinations thereof. a lignosulfonate, a sulfonated naphthalene condensate, a sulfonated acetone formaldehyde condensate (SAFC), a polyphosphate, an aminophosphonate, an aminophosphonic acid, or a combination thereof. In embodiments, the liquid additive composition comprises a lignosulfonate, a lignosulfonate that has been purified, refined, modified, or a combination thereof. In embodiments, the deflocculant can comprise a polyphosphate (e.g., sodium hexametaphosphate (SHMP)), an amino phosphonic acid (e.g., aminotris(methylenephosphonic acid) (ATMP)), or a combination thereof. The deflocculant can promote adsorption at surfaces and interfaces within liquids. By inhibiting particle aggregation, the deflocculant can enhance the stability of the suspension/liquid additive composition of this disclosure. Lignosulfonates are polyelectrolyte species comprising sulfonate and carboxylic acid groups. Lignosulfonates can be derived from lignin, an organic polymer found in the cell walls of plants, especially in wood and bark. In embodiments, the deflocculant comprises HR®-5 additive, available from Halliburton Energy Services, Inc., which is a chemically modified lignosulfonate. The lignosulfonate can comprise a salt of lignosulfonic acid, for example, a calcium, sodium, potassium, ammonium, magnesium, and/or iron salt of lignosulfonic acid. In embodiments, the deflocculant comprises one or more calcium lignosulfonates, sodium lignosulfonates, or a combination thereof (e.g., sodium/calcium lignosulfonate).

In embodiments, the deflocculant can be present in the liquid additive composition in an amount of from about greater than 0 (e.g., 0.01) pounds per barrel, 0.01, 0.05, 0.1, 0.2, 0.3, 0.4, or 0.5 to about 0.5, 1, 2, 3, 4, or 5 pounds per barrel (e.g., from about 0, 0.01, 0.02, 0.05, or 0.1 to about 0.2, 0.4, 0.5, 0.8, or 1 weight percent (wt. %)), based on a total weight of the liquid additive composition.

The liquid additive composition can optionally further include a viscosifier. In embodiments, the viscosifier can function as a suspending agent in the liquid additive composition. The viscosifier herein can also be referred to as a viscosifying suspending agent. Without being limited by theory, the viscosifier can prevent the particulate material (e.g., magnesium oxide) from settling in the liquid additive composition after preparation. In embodiments, the viscosifer comprises a biopolymer. In embodiments, the viscosifier comprises diutan. In embodiments, the viscosifier comprises amorphous silica. In embodiments, the viscosifier comprises diutan alone or in combination with amorphous silica. Nonlimiting examples of amorphous silica suitable for use as a viscosifier in the present disclosure include non-mined amorphous silica, precipitated silica, fumed silica, silica fume, porous silica, micro-sized silica, nano-sized silica, and the like, or combinations thereof. In an embodiment, the viscosifer comprises diutan and precipitated silica.

In embodiments, the viscosifier can comprise a biopolymer gum, guar gum, xanthan gum, welan gum, diutan, cellulose, hydroxyethyl cellulose (HEC), modified cellulose, diatomaceous earth, starch, modified/crosslinked starch, viscoelastic surfactants (VES), derivatives thereof, and the like, or combinations thereof.

The viscosifier can be present in the liquid additive composition in an amount of from about 0.01 wt. % to about 10 wt. %, alternatively from about 0.05 wt. % to about 9 wt. %, alternatively from about 0.1 wt. % to about 8 wt. %, alternatively from about 0.15 wt. % to about 7 wt. %, alternatively from about 0.25 wt. % to about 5 wt. %, alternatively from about 0.5 wt. % to about 4 wt. %, alternatively from about 1 wt. % to about 4 wt. %, or alternatively from about 2 wt. % to about 3 wt. %, based on a total weight of the liquid additive composition.

In some embodiments, diutan can be present in the liquid additive composition in an amount of from about 0 wt. % to about 0.1 wt. %, alternatively from about 0.001 wt. % to about 0.075 wt. %, or alternatively from about 0.01 wt. % to about 0.05 wt. %, based on a total weight of the liquid additive composition.

In some embodiments, amorphous silica can be present in the liquid additive composition in an amount of from about 0.25 wt. % to about 5 wt. %, alternatively from about 0.5 wt. % to about 4 wt. %, alternatively from about 1 wt. % to about 4 wt. %, or alternatively from about 2 wt. % to about 3 wt. %, based on a total weight of the liquid additive composition.

In embodiments, the liquid additive composition may comprise amorphous silica (e.g., precipitated silica) in an amount of from about 1 wt. % to about 4 wt. % and diutan in an amount of from about 0.01 wt. % to about 0.05 wt. %, based on a total weight of the liquid additive composition.

The liquid additive composition may comprise a surfactant. The (e.g., alcohol alkoxylate) surfactant can reduce surface tension between the organic carrier fluid (e.g., glycol) and the suspended (e.g., MgO) particles. The surfactant can thus reduce particle aggregation. In addition the surfactant helps prevent particle aggregation. The liquid additive composition may comprise an alcohol alkoxylate surfactant. For example, in embodiments, the liquid additive composition can comprise an alcohol ethoxylate surfactant. The glycol and the surfactant (e.g., alcohol alkoxylate surfactant) can also help reduce or prevent gelling of the liquid additive composition prior to using the liquid additive composition (e.g., prior to adding the liquid additive composition into a wellbore servicing fluid as described hereinbelow).

The alcohol alkoxylate surfactant can be characterized by the general formula $R^1(OR^2)_nOH$; wherein n (degree of ethoxylation) is from about 1 to about 30, alternatively from about 3 to about 25, or alternatively from about 3 to about 10. $R^1$ is an alkyl group, which can be either a linear alkyl group (i.e., $R^1$ is characterized by a degree of branching of equal to 0) or a branched alkyl group (i.e., $R^1$ is characterized by a degree of branching of greater than 0). In embodiments where $R^1$ is a branched alkyl group, $R^1$ can be characterized by a degree of branching of greater than 0, alternatively from about 1 to about 5, or alternatively from about 1 to about 4. For example, an alkyl group having a degree of branching of 1 displays a single branching point. $R^1$ can have from about 3 to about 25 carbon atoms, alternatively from about 5 to about 20 carbon atoms, or alternatively from about 8 to about 18 carbon atoms. $R^2$ is an alkylene group, which may be either linear or branched. In embodiments, $R^2$ can be ethylene, propylene, butylene, pentylene, and the like, or combinations thereof. $R^2$ can have from about 2 to about 5 carbon atoms, alternatively from about 2 to about 4 carbon atoms, or alternatively from about 2 to about 3 carbon atoms. In some embodiments, $R^2$ can be ethylene and/or propylene.

In embodiments, the alcohol alkoxylate surfactant can comprise an alcohol ethoxylate surfactant characterized by the general formula $R^1(OCH_2CH_2)_nOH$ having a degree of ethoxylation (n) of about 5, an $R^1$ carbon chain length of about 10, and a single branch point (i.e., a degree of branching of 1). A nonlimiting example of an alcohol ethoxylate surfactant includes LUTENSOL® XP50, which is a nonionic surfactant commercially available from BASF.

The liquid additive can comprise a fatty alcohol ethoxylate surfactant. Examples of suitable fatty alcohol ethoxylate surfactants include lauryl alcohol ethoxylate, behenyl alcohol ethoxylate, stearyl alcohol ethoxylate, or combinations thereof.

The optional surfactant (e.g., alcohol alkoxylate surfactant) can be present in the liquid additive composition in an amount of from about 0.1 wt. % to about 10 wt. %, alternatively from about 0.15 wt. % to about 5 wt. %, alternatively from about 0.25 wt. % to about 4 wt. %, alternatively from about 0.4 wt. % to about 2.5 wt. %, or alternatively from about 0.5 wt. % to about 1 wt. %, based on a total weight of the liquid additive composition.

In embodiments, the alcohol alkoxylate surfactant (e.g., alcohol ethoxylate surfactant) can be present in the liquid additive composition in an amount of from about 0.25 wt. % to about 4 wt. %, alternatively from about 0.4 wt. % to about 2.5 wt. %, or alternatively from about 0.5 wt. % to about 1 wt. %, based on a total weight of the liquid additive composition.

In embodiments, the liquid additive composition can comprise a particulate material (e.g., magnesium oxide (MgO)), an organic carrier fluid (e.g., monoethylene glycol (MEG)), a viscosifier (e.g., diutan and/or amorphous silica, such as precipitated silica), and an alcohol ethoxylate surfactant characterized by the general formula $R^1(OCH_2CH_2)_nOH$. In some embodiments, the liquid additive composition can comprise a particulate material (e.g., MgO), an organic carrier fluid (e.g., MEG), precipitated silica, diutan, and an alcohol ethoxylate surfactant characterized by the general formula $R^1(OCH\ CH_2)_nOH$; wherein n is about 5, wherein $R^1$ is an alkyl group having about 10 carbon atoms, and wherein $R^1$ is characterized by a degree of branching of about 1. In some such embodiments, the MgO can comprise non-calcined magnesium oxide, calcined magnesium oxide, lightly burned magnesium oxide, hard burned magnesium oxide, dead burned magnesium oxide, and the like, or a combination thereof.

In embodiments, the liquid additive composition can be a substantially homogenous mixture (e.g., a suspension) in which the particulate material (e.g., MgO) does not dissolve, but gets uniformly suspended throughout the bulk of the organic carrier fluid (e.g., MEG). For example, the particulate material (e.g., MgO) can be uniformly dispersed (e.g., floating around freely) in the liquid additive composition. A discontinuous internal phase (e.g., particulate material such as MgO) of the liquid additive composition can be uniformly dispersed throughout a continuous organic carrier fluid (e.g., MEG) external phase of the homogenous liquid additive composition through preparation (e.g., mixing or blending), optionally with the use of a viscosifying suspending agent (e.g., the viscosifier), such as amorphous silica (e.g., precipitated silica) and optionally diutan; optionally in the presence of a surfactant, such as an alcohol alkoxylate surfactant as disclosed herein.

In embodiments, the liquid additive composition can comprise (i) from about 40 wt. % to about 74.5 wt. % particulate material (e.g., magnesium oxide, non-calcined magnesium oxide, calcined magnesium oxide, lightly burned magnesium oxide, hard burned magnesium oxide, dead burned magnesium oxide, and the like, or combinations thereof), (ii) from about 25 wt. % to about 60 wt. % organic carrier fluid (e.g., ethylene glycol), (iii) from about greater than 0 (e.g., 0.01) to about 5 pounds per barrel (lb/bbl) deflocculant, and optionally (iv) from about 0.25 wt. % to about 5 wt. % amorphous silica (e.g., precipitated silica) viscosifier, and/or (v) from equal to or greater than about 0 wt. % to about 0.1 wt. % diutan viscosifier, and/or (vi) from about 0.25 wt. % to about 4 wt. % alcohol alkoxylate (e.g., ethoxylate) surfactant; based on a total weight of the liquid additive composition. The alcohol ethoxylate surfactant can be characterized by the general formula $R^1(OCH_2CH_2)_nOH$; wherein n is about 5, wherein $R^1$ is an alkyl group having about 10 carbon atoms, and wherein $R^1$ is characterized by a degree of branching of about 1.

In embodiments, the liquid additive composition is a MgO glycol suspension containing from about 10 to about 80, from about 20 to about 60, or from about 35 to about 45 wt. % (e.g., about 40 wt. %) particulate material (e.g., calcined MgO), and from about 90 to about 20, from about 80 to about 40, or from about 65 to about 55 wt. % organic carrier fluid (e.g., about 45.6 wt. % monoethylene glycol, and 11.4 wt. % polyethylene glycol 1000 MW), and optionally from about 0.5 to about 5, from about 1 to about 3, or from about 1.5 to about 2 wt. % (e.g., about 1.5 wt. %) surfactant (e.g., alcohol alkoxylate surfactant, alcohol ethoxylate surfactant), and/or optionally from about 0.5 to about 5, from about 1 to about 3, or from about 1.5 to about 2 wt. % (e.g., about 1.5 wt. %) viscosifier (e.g., fumed silica), based on a total weight of the liquid additive composition. The deflocculant (e.g., sodium and/or calcium lignosulfonate (e.g., HR®-5)) can be included at concentrations ranging from 0.01 to about 5, from about 0.1 to about 5, from about 0.5 to 2.0, or from about greater than 0, or about 0.01, 0.05, 0.1, 0.2, 0.3, 0.4, or 0.5 to about 5, 4, 3, 2, 1, or 0.5 pounds per barrel (lb/bbl), based on a total weight of the liquid additive composition.

In embodiments, the liquid additive composition can be characterized by a plastic viscosity (e.g., initial plastic viscosity and/or aged plastic viscosity) of from about 200 cP to about 2,500 cP, alternatively from about 300 cP to about 2,400 cP, alternatively from about 400 cP to about 2,200 cP, alternatively from about 500 cP to about 2,000 cP, or alternatively from about 600 cP to about 1,750 cP. The initial plastic viscosity and the aged plastic viscosity are measured under the same conditions at the time of preparing the composition and at a time later than the time of preparing the composition, respectively. The aged plastic viscosity can be measured after preparation at 1 day, 2 days, 3 days, 4 days, 5 days, 6 days, 7 days, 10 days, 14 days, 21 days, 28 days, etc. The initial plastic viscosity and the aged plastic viscosity can be calculated using a Herschel-Bulkley model.

In embodiments, the liquid additive composition can be characterized by a yield point (e.g., initial yield point and/or aged yield point) of from about 1 $lb_f/100\ ft^2$ to about 30 $lb_f/100\ ft^2$, alternatively from about 2.5 $lb_f/100\ ft^2$ to about 27.5 $lb_f/100\ ft^2$, alternatively from about 5 $lb_f/100\ ft^2$ to about 25 $lb_f/100\ ft^2$, or alternatively from about 10 $lb_f/100\ ft^2$ to about 20 $lb_f/100\ ft^2$. The initial yield point and the aged yield point are measured under the same conditions at the time of preparing the composition and at a time later than the time of preparing the composition, respectively. The aged yield point may be measured after preparation at 1 day, 2 days, 3 days, 4 days, 5 days, 6 days, 7 days, 10 days, 14 days, 21 days, 28 days, etc. The initial yield point and the aged yield point may be calculated using a Herschel-Bulkley model. In embodiments, the initial yield point of the liquid additive composition of this disclosure, as determined according to Herschel-Bulkley model, is at least 1, 5, or 10 $lb_f/100\ ft^2$. In embodiments, the aged yield point of the liquid additive composition of this disclosure, as determined according to Herschel-Bulkley model at a time subsequent the initial time of forming of the liquid additive composition, is at least 0.5, 3, or 5 $lb_f/100\ ft^2$.

The liquid additive composition of this disclosure can provide sufficient yield point (e.g., at low RPM readings (e.g., 3 RPM, 6 RPM), or no shear) such that the particulate can be maintained in suspension when the liquid additive composition is quiescent (e.g., during storage or transport), yet provides reduced viscosity at higher RPM levels (e.g., greater than or equal to about 30, 60, 100, 200, 300 RPM), exhibiting shear thinning, such that pumpability of the liquid additive composition of this disclosure can be facilitated relative to that an otherwise same liquid additive composition absent the deflocculant. Thus, the viscosity at lower RPM readings (e.g., 3 RPM, 6 RPM) and/or the yield points of the liquid additive compositions of this disclosure comprising the deflocculant can be similar to (e.g., within 5, 10, 15, or 20%) those of the otherwise same liquid additive composition absent the deflocculant, while the viscosity of the liquid additive compositions of this disclosure comprising the deflocculant at higher RPM readings (e.g., greater than or equal to about 30, 60, 100, 200, 300 RPM) can be (e.g., at least 5, 10, 20, or 30%) less than those of the otherwise same liquid additive composition absent the deflocculant.

In embodiments, the liquid additive composition of this disclosure can pose little or no risk (e.g., be PLONOR compliant), as evaluated by criteria such as bioaccumulation, biodegradation, and/or toxicity. The liquid additive composition of this disclosure can be North Sea Compliant. In embodiments, the liquid additive composition of this disclosure may contain components from the PLONOR list of chemicals considered to "pose little or no risk" to the environment or may be green or yellow rated according to OSPAR (Oslo and Paris Conventions). A substance can meet the following criteria to be classified under the 'green' category: bioaccumulation: log $P_{ow}<3$ or BCF<100 or molecular weight>700 g/mol, biodegradation: readily biodegradable, and toxicity: LC50 or EC50>100 mg/L. Log $P_{ow}$ is the logarithm of the octanol-water partition coefficient. The Bioconcentration Factor (BCF) can be defined as the ratio between the chemical concentration in an organism and the chemical concentration in the environment, and is typically used to express bioconcentration. The lethal concentration 50 (LC50) is the concentration at which an airborne chemical will kill 50% of laboratory animals exposed to it under proper testing conditions. The half maximal effective concentration (EC50) is a measure of the concentration of a drug, antibody or toxicant which induces a biological response halfway between the baseline and maximum after a specified exposure time.

In embodiments, components of the liquid additive composition and/or the wellbore servicing fluid comprising same (e.g., the organic carrier fluid, the deflocculant, the cementitious material, the one or more additives, etc.) are materials described to Pose Little or No Risk to the Environment (PLONOR). A noted above, the PLONOR list is an OSPAR (Oslo and Paris Conventions) list of substances and/or preparations used and discharged offshore that are deemed to cause no or little harm to the environment. In other words, in embodiments, the components of the liquid additive composition and/or the wellbore servicing fluid can be PLONOR materials. In embodiments, the liquid additive composition and/or the wellbore servicing fluid containing the liquid additive composition comprises, consists essentially of, or consists of PLONOR materials. In embodiments, a liquid additive composition and/or a wellbore servicing fluid comprising the liquid additive composition excludes any material that does not have a PLONOR designation (i.e., materials that are not on the PLONOR list). In embodiments, a liquid additive composition and/or wellbore servicing fluid of the type disclosed herein comprises equal to or less than about 25%, 20%, 15%, 10%, 5%, 1%, 0.1%, 0.001%, 0.0001%, 0.00001%, 0.000001%, or 0.0000001% non-PLONOR materials based on the total weight of the liquid additive composition and/or the wellbore servicing fluid, respectively.

In embodiments, the liquid additive composition as disclosed herein has a specific gravity of from about 1.0 to about 2.5, alternatively from about 1.2 to about 2.0, alternatively from about 1.5 to about 1.9, alternatively from about 1.55 to about 1.8, or alternatively from about 1.60 to about 1.75.

In embodiments, the liquid additive composition as disclosed herein has a flash point of equal to or greater than about 100° C., alternatively equal to or greater than about 110° C., or alternatively equal to or greater than about 125° C.

In embodiments, the liquid additive composition as disclosed herein has a melting point of less than about −10° C., alternatively less than about −15° C., or alternatively less than about −25° C.

In embodiments, the liquid additive composition as disclosed herein has a boiling point of equal to or greater than about 190° C., alternatively equal to or greater than about 200° C., or alternatively equal to or greater than about 210° C.

In embodiments, the liquid additive composition stays substantially homogeneous and in a pourable fluid form during a storage period after being prepared. During the storage period, the liquid additive composition may display a minimal amount of free fluid, such as less than about 25 vol. %, alternatively less than about 20 vol. %, alternatively less than about 15 vol. %, alternatively less than about 10 vol. %, or alternatively less than about 5 vol. %, based on a total volume of the liquid additive composition. The storage period can be equal to or greater than about 1 day, alternatively equal to or greater than about 7 days, alternatively equal to or greater than about 14 days, alternatively equal to or greater than about 21 days, or alternatively equal to or greater than about 28 days.

In embodiments, a liquid additive composition of the type disclosed herein can be prepared using any suitable method.

For example, a method of the present disclosure can comprise contacting components of the liquid additive composition (e.g., a particulate material, such as an expansion agent (MgO)); an organic carrier fluid, such as MEG; a deflocculant (e.g., a lignosulfonate); optionally, a surfactant, such as an alcohol alkoxylate surfactant, such as an alcohol ethoxylate surfactant; optionally, a viscosifier, such as amorphous silica (e.g., precipitated silica); and optionally an additional viscosifier such as diutan) to form the liquid additive composition. The contacting can comprise placing the components into a suitable liquid additive container (e.g., a mixer, a blender, a sonicator, a bid mill, a homogenizer) to form a suspension mixture, and blending the suspension mixture until the suspension mixture becomes a pumpable fluid (e.g., a liquid additive composition). The liquid additive container can be any container that is compatible with the suspension mixture and has sufficient space for the suspension mixture. A blender can be used for blending.

In embodiments, a method of making the liquid additive composition as disclosed herein may comprise (a) contacting a particulate material, an organic carrier fluid, and a deflocculant, and optionally a viscosifier and/or a surfactant (e.g., an alcohol alkoxylate surfactant) to form a suspension mixture; and (b) agitating (e.g., shearing, stirring, shaking, blending, mixing, gas bubbling, pumping, and the like, or combinations thereof) the suspension mixture to form the liquid additive composition.

In embodiments, a liquid additive composition of the type disclosed herein can be prepared by contacting a deflocculant, such as a lignosulfonate, and optionally a viscosifier, such as amorphous silica (e.g., precipitated silica), and an organic carrier fluid. The contacting can comprise placing the components into a suitable liquid additive container (e.g., a mixer, a blender, a sonicator, a bid mill, a homogenizer) to form a base mixture. In some embodiments, the deflocculant and/or viscosifier (e.g., amorphous silica) can be added to the organic carrier fluid, for example under agitation (e.g., shear), in order to form the base mixture. In other embodiments, the organic carrier fluid may be added to the deflocculant and/or viscosifier, for example under agitation, in order to form the base mixture. In yet other embodiments, the deflocculant and optional viscosifier and the organic carrier fluid can be added simultaneously to a mixing container, for example under agitation, in order to form the base mixture. The base mixture can then be contacted with the particulate material to be dispersed which is then mixed, as described herein, to form a uniform suspension comprising the particulate material. In embodiments where a viscosifier (e.g., additional viscosifier) other than amorphous silica is employed, the additional viscosifier can be contacted with and incorporated into the uniform suspension, for example under agitation. The uniform suspension can be contacted with the (e.g., alcohol alkoxylate) surfactant, such as an alcohol ethoxylate surfactant, to form a liquid additive composition.

In embodiments, a liquid additive composition of the type disclosed herein can be prepared by contacting the deflocculant (e.g., lignosulfonate), and optional viscosifier (e.g., amorphous silica (e.g., precipitated silica)) and organic carrier fluid (e.g., MEG) to form a base mixture. The contacting can comprise (i) placing the organic carrier fluid into a suitable liquid additive container (e.g., a mixer, a blender, a sonicator, a bid mill, a homogenizer) and applying shear to the organic carrier fluid; (ii) mixing (e.g., blending, adding) the deflocculant and/or optional viscosifier (e.g., amorphous silica) into the organic carrier fluid to form a base mixture; (iii) mixing the particulate material (e.g., an expansion agent, such as MgO) into the base mixture to form an uniform suspension; (iv) optionally adding a viscosifier (e.g., diutan) to the uniform suspension and applying shear; and (v) adding the surfactant (e.g., alcohol alkoxylate surfactant, such as an alcohol ethoxylate surfactant), to the uniform suspension to form a liquid additive composition.

In some embodiments, the order of addition of deflocculant, optional viscosifier(s), particulate material, and optional surfactant (e.g., alcohol alkoxylate surfactant) to the organic carrier fluid can be adjusted as necessary or desired.

The liquid additive composition as disclosed herein can be used in any suitable fluid, such as a wellbore servicing fluid. In embodiments, the wellbore servicing fluid can comprise a cementitious fluid.

In embodiments, the liquid additive composition can be prepared at the wellsite. Components of the liquid additive composition can be transported to the wellsite and combined (e.g., mixed/blended) proximate the wellsite to form the liquid additive composition. The components of the liquid additive composition can be pre-combined such that the liquid additive composition is prepared at a location remote from the wellsite and transported to the wellsite, and, if necessary, stored at an on-site location for use in making a wellbore servicing fluid. When it is desirable to prepare the liquid additive composition at the wellsite, the components of the liquid additive composition can be added into a liquid additive container (e.g., a blender tub, for example mounted on a trailer), and the suspension mixture can then be blended until the suspension mixture becomes a pumpable fluid (e.g., a liquid additive composition). In some other embodiments, the liquid additive composition can be prepared at a location remote from the wellsite, transported to the wellsite, optionally stored at the wellsite and combined with water, and other necessary components (e.g., a cement blend), and optionally one or more additives (e.g., supplemental additives), such as weighting agents, or weight-reducing agents to form a wellbore servicing fluid. Transporting of the liquid additive composition and/or the components of the liquid additive composition can be done by a ship, a pipeline, tanker truck, or any suitable transportation method.

In embodiments, the liquid additive composition can be present in a wellbore servicing fluid in an amount ranging from about 0.1 wt. % to about 60 wt. %, alternatively from about 0.1 wt. % to about 40 wt. %, alternatively from about 0.1 wt. % to about 20 wt. %, alternatively from about 0.5 wt. % to about 10 wt. %, or alternatively from about 1 wt. % to about 5 wt. %, based on the total weight of the wellbore servicing fluid.

In embodiments, the wellbore servicing fluid (e.g., cementitious fluid) further comprises one or more additives (e.g., supplemental additives). The one or more supplemental additives may comprise a defoamer, a cement retarder, a cement dispersant, a fluid loss control additive, a fume silica, a free fluid control additive, a viscosifying agent, an acid, a base, an emulsifier, a salt, a corrosion inhibitor, a mutual solvent, a conventional breaking agent, a relative permeability modifier, lime, a gelling agent, a crosslinker, a flocculant, a water softener, a proppant, an oxidation inhibitor, a thinner, a scavenger, a gas scavenger, a lubricant, a friction reducer, a bridging agent, a vitrified shale, a thixotropic agent, a surfactant, a scale inhibitor, a clay, a clay control agent, a clay stabilizer, a silicate-control agent, a biostatic agent, a storage stabilizer, a filtration control additive, a foaming agent, a foam stabilizer, latex emulsions, a formation conditioning agent, elastomers, gas/fluid absorbing materials, a lost circulation material, resins, superabsorbers, mechanical property modifying additives, inert particulates, and the like, or combinations thereof.

A wellbore servicing fluid (e.g., cementitious fluid) of the type disclosed herein can exclude a biocide. In embodiments, a wellbore servicing fluid of the type disclosed comprises equal to or less than about 1%, 0.1%, 0.001%, 0.0001%, 0.00001%, 0.000001%, or 0.0000001% biocide, based on the total weight of the wellbore servicing fluid.

The wellbore servicing fluid (e.g., cementitious fluid) can be used in a wellbore having a Bottomhole Circulating Temperature (BHCT) from about 70° F. to about 400° F., alternatively from about 120° F. to about 400° F., or alternatively from about 160° F. to about 370° F. In embodiments, the wellbore servicing fluid is used in a wellbore having a Bottomhole Static Temperature (BHST) from about 100° F. to about 400° F., alternatively from about 150° F. to about 400° F., or alternatively from about 190° F. to about 400° F.

In some embodiments, the wellbore servicing fluid comprising the liquid additive composition may be a cementitious fluid. A cementitious fluid refers to the material used to permanently seal an annular space between a casing and a wellbore wall. A cementitious fluid can also be used to seal formations to prevent loss of drilling fluid (e.g., in squeeze cementing operations) and for operations ranging from setting kick-off plugs to plug and abandonment of a wellbore. Generally, a cementitious fluid used in oil field is less viscous and has less strength than cement or concrete used for construction, since the cementitious fluid is required to be pumpable in a relatively narrow annulus over long distances.

In embodiments, the wellbore servicing fluid (e.g., cementitious fluid) comprises a cement blend. The cement blend can comprise, consist essentially of, or consist of a cementitious material. In an aspect, the cement blend comprises, consists essentially of, or consists of a dry, homogenous cementitious material in powder form. The cementitious material can comprise, consist essentially of, or consist of Portland cement, pozzolana cement, gypsum cement, shale cement, acid cement, base cement, phosphate cement, high alumina content cement, slag cement, silica cement, high alkalinity cement, magnesia cement, lime, amorphous silica, siliceous material, fly ash, any cementitious material, and the like, or combinations thereof. As used herein, the term "high alumina content cement" refers to a cement having an alumina concentration in the range of from about 40 wt. % to about 80 wt. %, by a weight of the high alumina content cement. The term "high alkalinity cement" refers to a cement having a sodium oxide concentration in the range of from about 1.0 wt. % to about 2.0 wt. %, by a weight of the high alkalinity cement.

In embodiments, the cementitious material is present in the cement blend in an amount of from about 1% BWOB (by weight of blend) to about 100% BWOB, alternatively from about 5% BWOB to about 100% BWOB, alternatively from about 10% BWOB to about 80% BWOB, or alternatively from about 20% BWOB to about 60% BWOB, based on a total weight of the cement blend. In an aspect, the cement blend consists of 100 BWOB of a single cementitious material in dry powder form.

In embodiments, the cement blend further comprises an expansion agent. Without limitation, examples of expansion agents suitable for use in the cement blend of the present disclosure include metal powders, aluminum powder, magnesium powder, iron powder, zinc powder, a gypsum blend, inorganic oxides, alkali metal oxides, alkaline earth metal oxides, magnesium oxide, non-calcined magnesium oxide, calcined magnesium oxide, lightly burned magnesium oxide, hard burned magnesium oxide, dead burned magnesium oxide, calcium oxide, inorganic silicates, magnesium iron silicate, olivine, an ettringite precursor, ettringite, calcium aluminum sulfate, hydrous calcium aluminum sulfate, a calcium aluminate mixture, a calcium aluminate cement (CAC) and calcium sulfate mixture, a gypsum blend (e.g., a calcium aluminate/calcium sulfate blend), and the like, or combinations thereof.

In embodiments where both the particulate material and the cement blend comprise an expansion agent, the expansion agent of the particulate material and the expansion agent of the cement blend can be the same or different. For example, in some embodiments, both the particulate material and the cement blend can independently comprise lightly burned magnesium oxide. As another example, in some embodiments, the particulate material can comprise aluminum powder, while the cement blend can comprise lightly burned magnesium oxide.

In embodiments, the expansion agent can be present in the cement blend in an amount of from about 1% BWOB to about 10% BWOB, alternatively from about 1.5% BWOB to about 7.5% BWOB, or alternatively from about 2% BWOB to about 5% BWOB, based on a total weight of the cement blend.

In embodiments, the cement blend further comprises one or more cement blend additives. The one or more cement blend additives can comprise quartz flour, bulk flow enhancer, aggregate, particles, filler, amorphous silica, siliceous material, fly ash, and the like, or combinations thereof.

In embodiments, the one or more cement blend additives can be present in the cement blend in an amount of from about 5% BWOB to about 95% BWOB, alternatively from about 5% BWOB to about 80% BWOB, alternatively from about 10% BWOB to about 60% BWOB, or alternatively from about 15% BWOB to about 40% BWOB, based on a total weight of the cement blend.

A cement blend of the type disclosed herein can be prepared using any suitable method. Components of the cement blend can be predetermined. In embodiments, the cement blend comprises more than one component (e.g., a cementitious material, an expansion agent, a bulk flow enhancer, and one or more cement blend additives), which can be dry mixed to form the cement blend. The dry mixing can be at a location away from the wellsite and the cement blend can be transported to the wellsite. In embodiments, the components of the cement blend can be prepared at a location remote from the wellsite and transported to the wellsite, and, if necessary, stored at an on-site location. When desired, the components of the cement blend can be dry mixed at the wellsite. In embodiments, the cement blend contains (e.g., consists essentially of or consists of) one component (i.e., a cementitious material) and can be transported and stored at the wellsite. Transporting of the cement blend and/or the components of the cement blend can be by a ship or any suitable transportation. In embodiments, the components of the cement blend can be added to a dry-mixing container (e.g., a mixing head of a solid feeding system) and be dry mixed therein. The dry-mixing container can be any container that is compatible with the components of the cement blend and has sufficient space for the components of the cement blend. A blender can be used for dry mixing.

In embodiments, the cement blend can be present in the wellbore servicing fluid in an amount ranging from about 20 wt. % to about 90 wt. %, alternatively from about 40 wt. % to about 80 wt. %, or alternatively from about 60 wt. % to about 70 wt. %, based on the total weight of the wellbore servicing fluid.

The wellbore servicing fluid (e.g., cementitious fluid) can comprise water (e.g., with which the particulate can react downhole (for example, MgO hydration to $Mg(OH)_2$)). The water can be selected from a group including freshwater, seawater, saltwater, brine (e.g., underground natural brine, formulated brine, etc.), and combinations thereof. Generally, the water may be from any source, provided that it does not contain an amount of components that may undesirably affect the other components in the wellbore servicing fluid. The water can be present in the wellbore servicing fluid in an amount effective to provide a slurry having desired (e.g., job or service specific) rheological properties. The water can be present in the wellbore servicing fluid in an amount of from about 10 L/100 kg to about 400 L/100 kg, alternatively from about 20 L/100 kg to about 150 L/100 kg, or alternatively from about 30 L/100 kg to about 65 L/100 kg, based on a total weight of the cement blend.

In embodiments, the wellbore servicing fluid (e.g., cementitious fluid) further comprises a weighting agent and/or a weight-reducing agent. In embodiments, a weighting agent and/or a weight-reducing agent may be included within the cement blend (e.g., as part of a dry cement blend or dry cementitious composition) prior to formation of a wellbore servicing fluid by mixing the cement blend with water to form a pumpable cement slurry. A weighting agent can increase a density of the wellbore servicing fluid. Nonlimiting examples of suitable weighting agents for the present disclosure include barium sulfate, (i.e., barite), iron oxide (i.e., hematite), manganese oxide (i.e., hausmannite), and combinations thereof. An example of weighting agent suitable for use in this disclosure includes without limitation a synthetic hausmannite known as MICROMAX® FF weight additive, which is commercially available from Elkem Materials Inc. A weight-reducing agent can reduce a density of the wellbore servicing fluid. Nonlimiting examples of suitable weight-reducing agents suitable for use in the present disclosure include hollow glass and ceramic beads.

The amount of the weighting agent or weight-reducing agent in the wellbore servicing fluid (e.g., cementitious fluid) may be an amount effective to produce a desired density of the wellbore servicing fluid. In embodiments, the weighting agent or the weight-reducing agent can be present in the wellbore servicing fluid in an amount of from about 1% BWOB to about 200% BWOB, alternatively from about 5% BWOB to about 150% BWOB, or alternatively from about 10% BWOB to about 100% BWOB, based on a total weight of the cement blend.

In embodiments, the wellbore servicing fluid (e.g., cementitious fluid) comprising a cement blend further comprises a foaming agent. In such embodiments, the wellbore servicing fluid comprising a cement blend forms a foamed cement having a density that is reduced in comparison to an otherwise similar composition prepared in the absence of the foaming agent. The foaming agent may be introduced (e.g., added into the wellbore servicing fluid) prior to placing the wellbore servicing fluid in the wellbore. The addition of a foaming agent to the cement composition may be accomplished by any suitable method. In embodiments, the foaming agent comprises a gas such as air, an inert gas such as nitrogen, and combinations thereof. The gas (e.g., nitrogen) may be introduced by direct injection into the wellbore servicing fluid. In such embodiments, the gas is present in the wellbore servicing fluid in an amount of from about 10 vol. % to about 30 vol. %, based on a total volume of the wellbore servicing fluid placed in the wellbore.

In embodiments, the foamed cement can have a density (e.g., a target density of the wellbore servicing fluid) of from about 5 ppg to about 16 ppg, alternatively from about 8 ppg to about 15 ppg, or alternatively from about 10 ppg to about 14 ppg.

In embodiments, the one or more additives (e.g., supplemental additives) can be present in the wellbore servicing fluid (e.g., cementitious fluid) in a total amount of from about 0.1 L/100 kg to about 50 L/100 kg, based on a total weight of the cement blend, alternatively from about 1 L/100 kg to about 35 L/100 kg, or alternatively from about 5 L/100 kg to about 20 L/100 kg, based on a total weight of the wellbore servicing fluid. Additives suitable for use in the present disclosure may be in solid form and in such embodiments the additive may be included in the wellbore servicing fluid in amounts of from about 0.05% BWOB to about 100% BWOB, alternatively from about 0.5% BWOB to about 50% BWOB, or alternatively from about 5% BWOB to about 20% BWOB, based on a total weight of the cement blend.

In embodiments, the wellbore servicing fluid (e.g., cementitious fluid) has a density of from about 9 pounds per gallon (ppg) to about 26 ppg, alternatively from about 11 ppg to about 22 ppg, or alternatively from about 13 ppg to about 18 ppg.

In embodiments, a wellbore servicing fluid (e.g., cementitious fluid) suitable for use in the present disclosure comprises about 20 wt. % of a cement blend based on the total weight of the wellbore servicing fluid and about 400 L/100 kg of water BWOB and has a density of about 9.6 ppg. In some other embodiments, a wellbore servicing fluid suitable for use in the present disclosure comprises about 40 wt. % of a cement blend based on the total weight of the wellbore servicing fluid and about 150 L/100 kg of water BWOB and has a density of about 11.5 ppg. In some other embodiments, a wellbore servicing fluid suitable for use in the present disclosure comprises about 60 wt. % of a cement blend based on the total weight of the wellbore servicing fluid and about 65 L/100 kg of water BWOB and has a density of about 14.1 ppg. In some other embodiments, a wellbore servicing fluid suitable for use in the present disclosure comprises about 70 wt. % of a cement blend based on the total weight of the wellbore servicing fluid and about 40 L/100 kg of water BWOB and has a density of about 16.0 ppg. In some other embodiments, a wellbore servicing fluid suitable for use in the present disclosure comprises about 75 wt. % of a cement blend based on the total weight of the wellbore servicing fluid and about 35 L/100 kg of water BWOB and has a density of about 17.1 ppg. In yet some other embodiments, a wellbore servicing fluid suitable for use in the present disclosure comprises about 90 wt. % of a cement blend based on the total weight of the wellbore servicing fluid and about 15 L/100 kg of water BWOB and has a density of about 21 ppg.

In embodiments, the wellbore servicing fluid (e.g., cementitious fluid) has a specific gravity of from about 0.5 to about 3, alternatively from about 1.1 to about 2.5, alternatively from about 1.3 to about 2.3, or alternatively from about 1.5 to about 2.0.

In embodiments, the wellbore servicing fluid (e.g., cementitious fluid) has a mixability rating of from about 3 to about 5, alternatively from about 4 to about 5. The mixability rating is on a 0 to 5 scale, where 0 is not mixable and 5 is fully mixable.

In embodiments, the wellbore servicing fluid (e.g., cementitious fluid) has a fluid loss of from about 10 ml per 30 minutes to about 250 ml per 30 minutes, alternatively from about 20 ml per 30 minutes to about 100 ml per 30 minutes, or alternatively from about 30 ml per 30 minutes to about 50 ml per 30 minutes, when measured on a 325 mesh screen at about 129° F. and 1,000 psig differential pressure in accordance with a test standard API-RP-10B-2.

In embodiments, the wellbore servicing fluid (e.g., cementitious fluid) has a 10-second static gel strength of from about 1 to about 50, alternatively from about 5 to about 40, or alternatively from about 10 to about 30, when measured at about 129° F. in accordance with the test standard API-RP-10B-2. In embodiments, the wellbore servicing fluid has a 10-minute static gel strength of from about 1 to about 300, alternatively from about 5 to about 150, or alternatively from about 10 to about 75, when measured at about 129° F. in accordance with the test standard API-RP-10B-2.

In embodiments, the wellbore servicing fluid (e.g., cementitious fluid) has a thickening time of from about 3 hours to about 24 hours, alternatively from about 4 hours to about 16 hours, or alternatively from about 5 hours to about 8 hours, when measured in accordance with the test standard API-RP-10B-2 to achieve about 70 Bearden consistency units (Bc) at about 129° F. and 5,000 psig.

In embodiments, the wellbore servicing fluid (e.g., cementitious fluid) has a 50 psi Ultrasonic Cement Analyzer (UCA) compressive strength of from about 1 hour to about 48 hours, alternatively from about 4 hours to about 24 hours, or alternatively from about 6 hours to about 18 hours, when measured at about 168° F. and 5,000 psig.

In embodiments, the wellbore servicing fluid (e.g., cementitious fluid) has a 500 psi UCA compressive strength of from about 2 hours to about 72 hours at, alternatively from about 6 hours to about 36 hours, or alternatively from about 8 hours to about 24 hours, when measured at about 168° F. and 5,000 psig in accordance with the test standard API-RP-10B-2.

In embodiments, the wellbore servicing fluid (e.g., cementitious fluid) has a 24 hr UCA compressive strength of from about 50 psig to about 10,000 psig, alternatively from about 250 psig to about 6,000 psig, or alternatively from about 500 psig to about 4,000 psig, when measured at about 168° F. and 5,000 psig in accordance with the test standard API-RP-10B-2.

In embodiments, the wellbore servicing fluid (e.g., cementitious fluid) has rheology readings in a range of from about 1 to about 350 at about 68° F., alternatively from about 2 to about 350 at about 129° F., or alternatively from about 2 to about 350 at about 190° F., when measured by a Fann® Model 35 viscometer at a speed of 3 rpm to 300 rpm in accordance with the test standard API-RP-10B-2.

In embodiments, after being cured at about 212° F. and 5,000 psig for about 7 days, the wellbore servicing fluid (e.g., cementitious fluid) forms a set cement having a crush compressive strength of from about 500 psig to about 12.000 psig, alternatively from about 1,500 psig to about 9,000 psig, or alternatively from about 3,000 psig to about 7,000 psig.

In embodiments, after being cured at about 212° F. and 5,000 psig for about 7 days, the wellbore servicing fluid (e.g., cementitious fluid) forms a set cement having a Young's Modulus of from about 0.3 Mpsig to about 3 Mpsig, alternatively from about 0.8 Mpsig to about 2 Mpsig, or alternatively from about 1.2 Mpsig to about 1.6 Mpsig.

In embodiments, after being cured at about 212° F. and 5,000 psig for about 7 days, the wellbore servicing fluid (e.g., cementitious fluid) forms a set cement having a Brazilian Tensile Strength of from about 50 psig to about 1,600 psig, alternatively from about 100 psig to about 900 psig, or alternatively from about 200 psig to about 700 psig.

A wellbore servicing fluid of the type disclosed herein can be prepared using any suitable method. In embodiments, a method of making the wellbore servicing fluid comprises contacting water with the liquid additive composition, cement blend, and optionally additives to form the wellbore servicing fluid.

In embodiments, the wellbore servicing fluid (e.g., cementitious fluid) can be prepared at the wellsite. Components of the wellbore servicing fluid can be transported to the wellsite and combined (e.g., mixed/blended) proximate the wellsite to form the wellbore servicing fluid. The components of the wellbore servicing fluid can be added into a container (e.g., a blender tub, for example mounted on a trailer), and the wellbore servicing fluid is then blended until the wellbore servicing fluid becomes a pumpable fluid.

The methods disclosed herein for preparing the wellbore servicing fluid (e.g., cementitious fluid) can comprise a continuous process (also referred to as an "on-the-fly" process). A continuous process or an "on-the-fly" process means one or more steps in the process are running on a continuous basis. For example, a contacting step can be continuous in which wellbore servicing fluid components are contacted in a container (e.g., a blender or mixer) in a manner that yields an about constant output of the wellbore servicing fluid from the container. The pumps, the blender, and other process equipment can operate at about steady state conditions during a continuous process, with the understanding that one or more operational parameters (e.g., rate, pressure, etc.) in the continuous process can be adjusted during the process. The continuous process can be performed by using proper equipment (e.g., a mixer, a blender, feeders, pumps, etc.) and process management/control. For example, forming the liquid additive composition can be continuous using pumps and a blender; forming the cement blend can be continuous using a blender and solid feeders; conveying water, the liquid additive composition, and/or the one or more additives (e.g., supplemental additives) can be continuous using pumps; combining the cement blend with a mixture in the container can be continuous using a feeder; blending the cementitious fluid in the container can be continuous by generating a whirlpool continuously; and any combination thereof may be employed in a continuous process of the type described herein.

In embodiments, the liquid additive composition can be added at a controlled rate to the water or the wellbore servicing fluid (e.g., cementitious fluid) using a continuous mixing system (CMS) unit. The CMS unit can also be employed to control the rate at which water is introduced to the wellbore servicing fluid (e.g., cementitious fluid) as well as the rate at which any other optional additives are introduced to the wellbore servicing fluid or the water. As such, the CMS unit can be used to achieve an accurate and precise ratio of individual components in the wellbore servicing fluid, such that the properties of the wellbore servicing fluid are suitable for the downhole conditions of the wellbore. The concentrations of the components in the wellbore servicing fluid (e.g., cementitious fluid) can be adjusted to their desired amounts before delivering the composition into the wellbore. Those concentrations thus are not limited to the original design specification of the wellbore servicing fluid (e.g., cementitious fluid) composition and can be varied to account for changes in the downhole conditions of the wellbore that may occur before the composition is actually pumped into the wellbore.

After preparation, the liquid additive composition as disclosed herein can be added to a cement mixture to achieve post-set expansion. In some embodiments, for example in offshore operations, the liquid additive composition as disclosed herein can be added via a CMS to a water line going into a recirculating cement mixture (RCM). Mix water and cement (e.g., cement blend) may be combined in the RCM and then pumped downhole. In other embodiments, the liquid additive composition as disclosed herein can be batch mixed into the cement slurry (as opposed to adding the liquid additive composition via the CMS).

In embodiments, a cementitious fluid of the type disclosed herein can be prepared using any suitable method. In embodiments, a method of making the cementitious fluid comprises contacting water with the liquid additive composition and a cement blend prepared using the methods disclosed hereinabove at a location proximate a wellsite. The wellsite can comprise an offshore platform (e.g., an offshore oil and gas platform) and/or a floating vessel and the wellbore can be offshore. FIG. 1 depicts a process flow diagram of a method 200 of making a wellbore servicing fluid (e.g., cementitious fluid) of the type disclosed herein. Referring to FIG. 1, the water can be conveyed via a water flow line 201 from any resource, for example, seawater around the wellsite, produced water, and water conveyed from onshore. The method can comprise contacting a liquid additive composition of the type disclosed herein with water to form a mixture. Contacting the liquid additive composition with water can comprise conveying (e.g., via a liquid additive flow line 202) the liquid additive composition into the water in the water flow line 201. The combination of water and the liquid additive composition can be referred to as a diluted liquid additive composition or a first mixture. In embodiments, one or more additives (e.g., supplemental additives) of the type disclosed herein optionally can be added into the first mixture in a mixture flow line 205, for example by conveying the one or more supplemental additives (e.g., via one or more supplemental additive flow lines 204) into the first mixture in the mixture flow line 205 to form a second mixture. After contacting the liquid additive composition with water to form the first mixture, and optionally adding the one or more supplemental additives into the first mixture to form the second mixture, the first or second mixture can be further contacted with a cement blend prepared using the methods disclosed hereinabove. In embodiments, the first or second mixture is conveyed via the mixture flow line 205 to a container. The container can be any container that is compatible with the first or second mixture and the cement blend and has sufficient space. The cement blend can be added (e.g., metered by a solids feeding system such as a conveyor or auger) into the container and blended with the first or second mixture. The blending can be conducted using any suitable method/tool (e.g., a blender) until a pumpable fluid (e.g., the wellbore servicing fluid; cementitious fluid) is formed. In embodiments, the blending comprises generating whirlpools (e.g., vortexes) in the cementitious fluid. Whirlpools can be generated by any suitable method, for example by a nozzle that releases a jet of the contents of the container therein (e.g., a pump-around loop). In embodiments, prior to and/or concurrent with contacting the cement blend with the first or second mixture, the method further comprises adding a weighting agent or a weight-reducing agent to the cement blend, to the first mixture, to the second mixture, directly to the container, or any combination thereof. The weighting agent or the weight-reducing agent can be placed into the container having the other components of the wellbore servicing fluid therein.

The methods disclosed herein for preparing the cementitious fluid can comprise a continuous process (also referred to as an "on-the-fly" process). For example, a contacting step can be continuous in which the cement blend and the first or second mixture are contacted in a container (e.g., a blender or mixer) in a manner that yields an about constant output of the wellbore servicing fluid from the container. The pumps, the blender, and other process equipment can operate at about steady state conditions during a continuous process, with the understanding that one or more operational parameters (e.g., rate, pressure, etc.) in the continuous process can be adjusted during the process of making the cementitious fluid. The continuous process of making the cementitious fluid can be performed by using proper equipment (e.g., a mixer, a blender, feeders, pumps, etc.) and process management/control. For example, forming the liquid additive composition can be continuous using pumps and a blender; forming the cement blend can be continuous using a blender and solid feeders; conveying water, the liquid additive composition, and/or the one or more supplemental additives can be continuous using pumps; combining the cement blend with the first or second mixture in the container can be continuous using a feeder; blending the wellbore servicing fluid in the container can be continuous by generating a whirlpool continuously; and any combination thereof may be employed in a continuous process of the type described herein.

Figure 2:
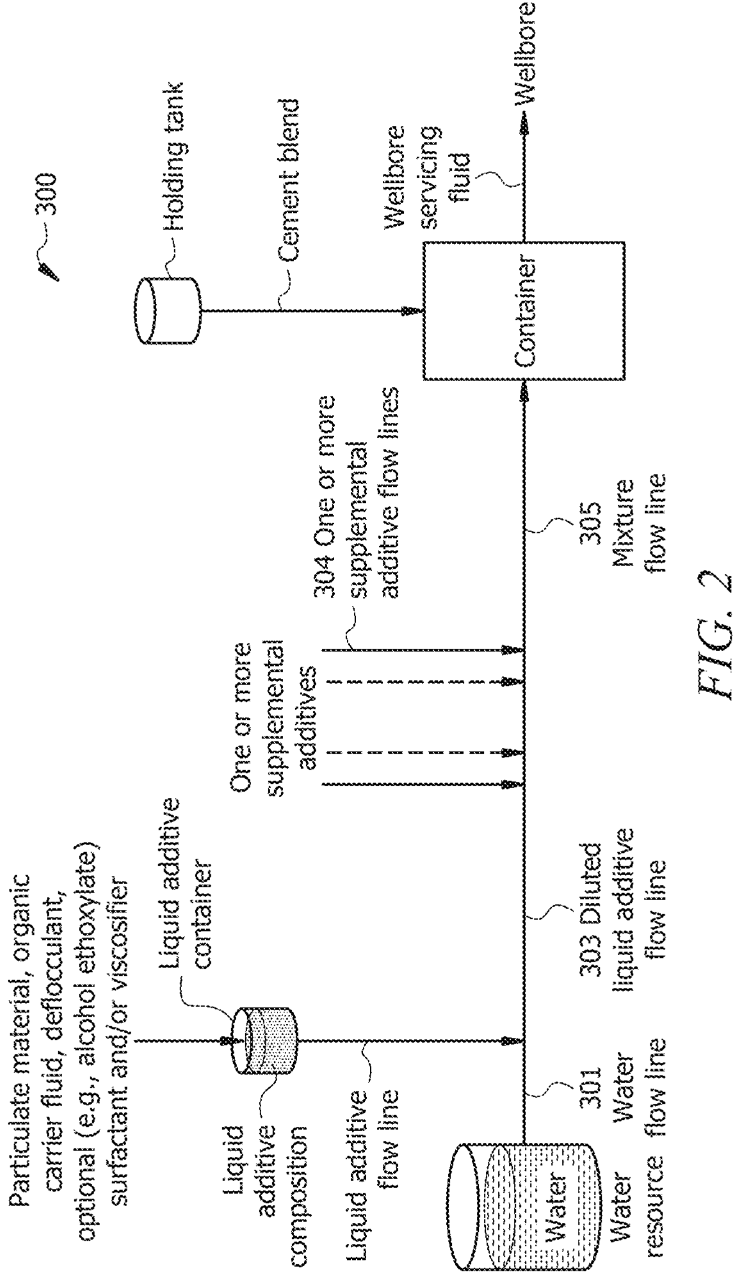
FIG. 2 is a process flow diagram according to some embodiments of the disclosure.

In embodiments, referring to FIG. 2, a method 300 disclosed herein comprises contacting a particulate material (e.g., an expansion agent, such as MgO), an organic carrier fluid (e.g., MEG), deflocculant (e.g., lignosulfonate), optional viscosifier (e.g., amorphous silica (e.g., precipitated silica)), optional surfactant (e.g., an alcohol alkoxylate surfactant (e.g., an alcohol ethoxylate surfactant)), and optionally an additional viscosifier (e.g., diutan) of the types disclosed herein to form a liquid additive composition of the type disclosed herein. The contacting can be in a liquid additive container, and can occur proximate a wellsite or remote from a wellsite (e.g., prepared remotely and transported to a wellsite such as an offshore platform or a floating vessel). The method can take place at a location proximate an offshore platform and/or a floating vessel, where a water flow line 301 conveys water from a water resource (e.g., seawater around the offshore platform or the floating vessel). The method can further comprise conveying the liquid additive composition via a liquid additive flow line 302 into the water in the water flow line 301 to form a diluted liquid additive. In embodiments, the method further comprises conveying one or more additives (e.g., supplemental additives) via one or more supplemental additive flow lines 304 into the diluted liquid additive in a diluted liquid additive flow line 303 to form a mixture in a mixture flow line 305. One or more pumps can be used on each of the water flow line 301, the liquid additive flow line 302, the diluted liquid additive flow line 303, the one or more supplemental additive flow lines 304, and the mixture flow line 305. In embodiments, the method further comprises placing the mixture in a container (e.g., a mixing container). A cement blend of the type disclosed herein from a cement blend resource (e.g., a holding tank) can be added into the mixture to form a slurry within the container. A solid feeding system (e.g., a solid feeder such as an auger feeder or a screw feeder) can be used for adding the cement blend into the container. The method can further comprise blending the slurry to form a pumpable fluid (e.g., the cementitious fluid). The blending can be by a blender. In embodiments, the blending is by generating whirlpools in the slurry within the container (e.g., by a nozzle in the container that releases a jet of the slurry). The wellbore servicing fluid can then be placed downhole.

In embodiments, a wellbore servicing fluid of the type disclosed herein is used as a cementitious fluid, for example comprising a cement blend of the type disclosed herein. The method of the present disclosure can further comprise placing the wellbore servicing fluid in an offshore wellbore penetrating a subterranean formation and allowing at least a portion of the wellbore servicing fluid to set. The wellbore servicing fluid can be used to permanently seal the annular space between the conduit (e.g., casing) and the wellbore wall or the annular space between two casings. The wellbore servicing fluid can also be used to seal formations to prevent loss of drilling fluid (e.g., in squeeze cementing operations) and for operations ranging from setting kick-off plugs to plug and abandonment of a wellbore.

In embodiments, a wellbore servicing fluid (e.g., cementitious fluid) of the type disclosed herein can be employed in well completion operations such as primary and secondary cementing operations. The cementitious fluid may be placed into an annulus of the wellbore (e.g., an annulus formed between casing and a wellbore wall) and allowed to set such that it isolates the subterranean formation from a different portion of the wellbore. The cementitious fluid thus forms a barrier that prevents fluids in that subterranean formation from migrating into other subterranean formations. Within the annulus, the cementitious fluid also serves to support a conduit, e.g., casing, in the wellbore. In embodiments, the wellbore in which the cementitious fluid is positioned belongs to a multilateral wellbore configuration. It is to be understood that a multilateral wellbore configuration includes at least two principal wellbores connected by one or more ancillary wellbores.

In secondary cementing, often referred to as squeeze cementing, the wellbore servicing fluid (e.g., cementitious fluid) can be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, to plug a permeable zone, and so forth.

Figure 3:
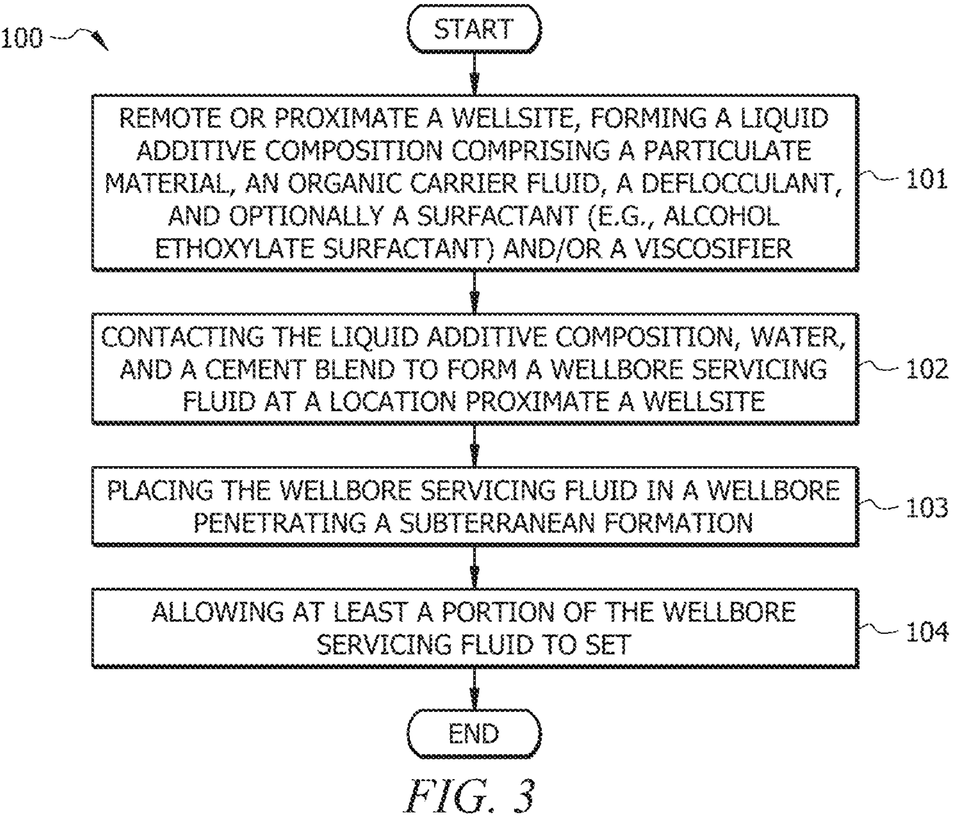
FIG. 3 is a flow chart of a method according to some embodiments of the disclosure.

FIG. 3 illustrates a method 100 in accordance with the present disclosure. Block 101 includes forming a liquid additive composition of the type disclosed herein, either at (e.g., proximate) a wellsite or remote from the wellsite and transported to the wellsite. The forming can comprise contacting a particulate material (e.g., an expansion agent, such as MgO), an organic carrier (e.g., MEG), a deflocculant (e.g., lignosulfonate), an optional viscosifier (e.g., amorphous silica (e.g., precipitated silica) and/or diutan), and/or an optional surfactant (e.g., an alcohol alkoxylate surfactant (e.g., alcohol ethoxylate surfactant)). Block 102 includes contacting the liquid additive composition, water, and a cement blend of the type disclosed herein to form a wellbore servicing fluid (e.g., cementitious fluid) at a location proximate a wellsite. The wellsite can be an offshore oil and gas platform and/or a floating vessel. Block 103 includes placing the wellbore servicing fluid in a wellbore penetrating a subterranean formation, for example as a primary or secondary cementing operation. The wellbore can be an offshore wellbore. Block 104 includes allowing at least a portion of the wellbore servicing fluid (e.g., cementitious fluid) to set. At least a portion of block 101, block 102, and block 103 can comprise a continuous process as disclosed herein.

Figure 4:
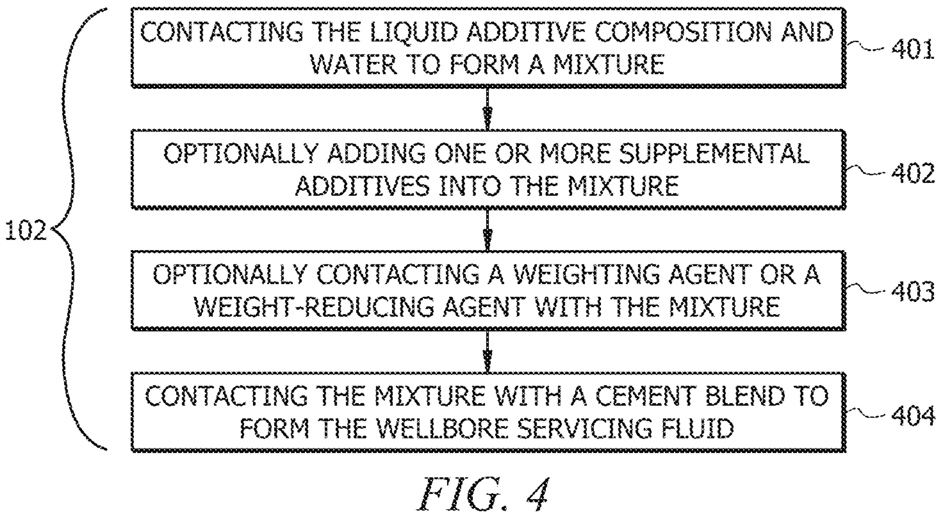
FIG. 4 is a flow chart of a method according to some embodiments of the disclosure.

Referring to FIG. 4, in embodiments, block 102 further comprises block 401, block 402, block 403, and block 404. Block 401 includes contacting the liquid additive composition and water to form a mixture. Block 402 is optional and includes adding one or more additives (e.g., supplemental additives) of the type disclosed herein into the mixture. Block 403 is optional and includes contacting a weighting agent or a weight-reducing agent with the mixture. Block 404 includes contacting the mixture with the cement blend to form a wellbore servicing fluid (e.g., cementitious fluid).

Figure 5:
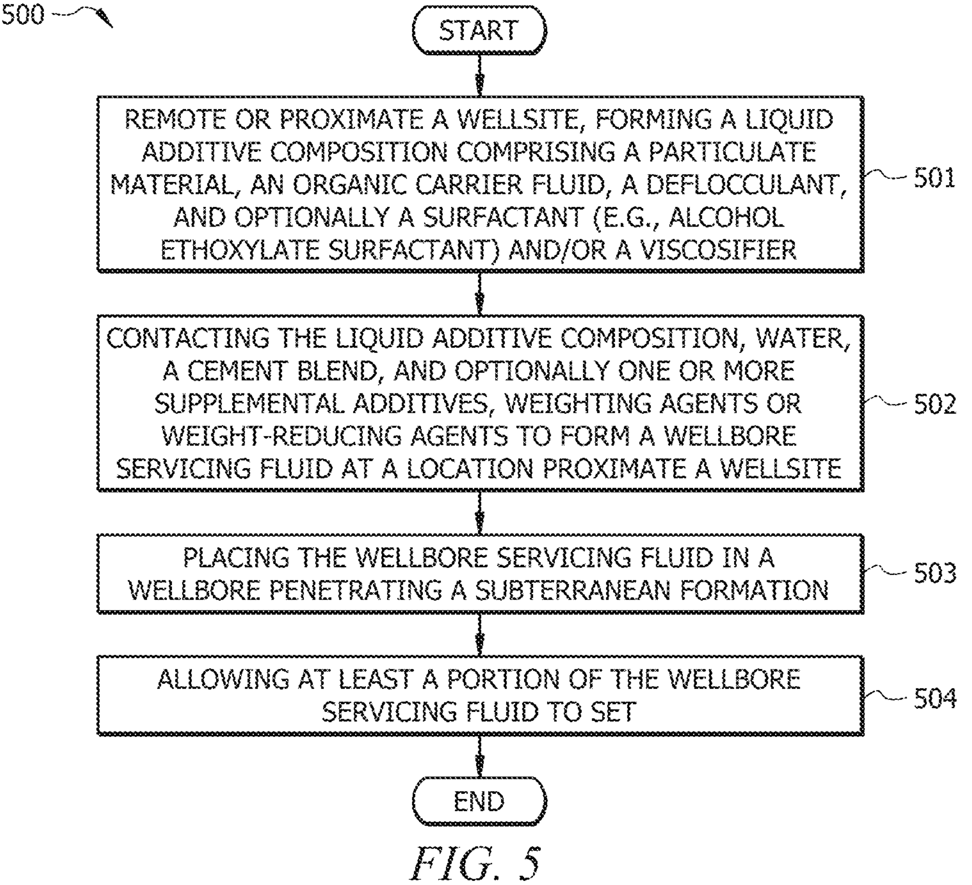
FIG. 5 is a flow chart of a method according to some embodiments of the disclosure.

FIG. 5 illustrates a method 500 in accordance with the present disclosure. Block 501 includes forming a liquid additive composition of the type disclosed herein, either at (e.g., proximate) a wellsite or remote from the wellsite and transported to the wellsite. The forming can comprise contacting a particulate material (e.g., an expansion agent, such as MgO), an organic carrier (e.g., MEG), a deflocculant (e.g., lignosulfonate), one or more viscosifiers (e.g., amorphous silica (e.g., precipitated silica) and/or diutan), and/or a surfactant (e.g., an alcohol alkoxylate surfactant (e.g., alcohol ethoxylate surfactant)). Block 502 includes contacting the liquid additive composition, water, a cement blend of the type disclosed herein (e.g., a dry cement blend comprising a cementitious material and optionally one or more dry additives), and optionally one or more additives (e.g., supplemental additives) and/or weighting agents or weight-reducing agents, to form a wellbore servicing fluid (e.g., cementitious fluid) at a location proximate a wellsite. The wellsite can be an offshore oil and gas platform and/or a floating vessel. Block 503 includes placing the wellbore servicing fluid in a wellbore penetrating a subterranean formation, for example as a primary or secondary cementing operation. The wellbore can be an offshore wellbore. Block 504 includes allowing at least a portion of the wellbore servicing fluid to set. At least a portion of block 501, block 502, and block 503 can comprise a continuous process as disclosed herein.

Various benefits may be realized by utilization of the presently disclosed methods and compositions. For example, the wellbore servicing compositions (e.g., cementitious fluid) of the present disclosure may exclude a biocide resulting in a reduced risk to organisms in surrounding environment. In addition, an advantage of the present disclosure is that the liquid additive composition used in the disclosed compositions and methods is easier to handle and allows improved accuracy with regard to metering an amount to add to a system, compared with a dry powder expansion agent. For example, some fluid preparation systems that cannot process a dry powder expansion agent due to limited equipment/tools (e.g., equipment/tools at an offshore platform) can process the liquid additive composition. Due to incorporation of the deflocculant, the herein disclosed liquid additive composition can exhibit improved dispersion and stabilization (e.g., reduced gelation and/or agglomeration of particulate) relative to a same liquid additive composition absent the deflocculant. Also, the liquid additive composition can be stable for more than 7 days which allows a sufficient time for transportation and storage.

As noted herein, particulate (e.g., calcined MgO) suspensions in glycol based fluids can experience flocculation over time as a result of electrostatic forces between the suspended (e.g., MgO) particles. In concentrated suspensions, this can manifest as the development of strong gels over a period of time. Gels may hinder chemical transfers using surface equipment. In severe cases of gelation material may be rendered unusable. The herein disclosed liquid additive composition comprises a deflocculant that can reduce or eliminate the formation of strong gels and/or reduce the viscosity of the liquid additive composition.

As disclosed herein, a pumpable liquid containing an expansion agent (e.g., MgO) may advantageously allow for using the liquid additive composition in offshore cementing operations without adding the expansion agent to the cement dry powder blend. The liquid additive composition can be transported to the offshore rig as a liquid, stored in a chemical room and used on an as needed basis. This can advantageously eliminate or reduce unnecessary additions to the dry cement powder blend, thereby reducing material costs and increasing asset value.

The liquid additive composition as disclosed herein (e.g., MgO in MEG suspension containing deflocculant) may advantageously allow for pumping particulate material (e.g., expansion agent, such as MgO) as a liquid. When the liquid additive composition comprises MgO, the liquid additive composition may advantageously prevent MgO hydration to $Mg(OH)_2$ prior to use. The liquid additive composition as disclosed herein can advantageously contain more than 40 wt. % MgO, which can be enabled through the use of deflocculant and/or optional viscosifiers (e.g., amorphous silica (e.g., precipitated silica) and diutan gum), which can be added to the composition for rheological control and product stability. The optional surfactant, such as an alcohol alkoxylate surfactant (e.g., alcohol ethoxylate surfactant), can be added to the liquid additive composition to maintain free flow of the liquid additive composition and reduce/prevent gelation. Heretofore, conventional ways of introducing an expansion agent to a cementitious fluid have not been highly effective for materials as dense as MgO, and typically require a relatively higher level of rheological control. The liquid additive composition as disclosed herein overcomes the limitations of conventional methods which suffer from gelation/separation concerns.

Inclusion of deflocculant, such as lignosulfonate, and optionally surfactant, such as an alcohol alkoxylate surfactant (e.g., alcohol ethoxylate surfactant), with an organic carrier fluid, such as MEG, as described herein, can advantageously prevent the development of strong gels, maintain product fluidity, reduce fluid separation, and/or mitigate hard packing of the solids during storage. Conventional suspensions that comprise an expansion agent and MEG, but no deflocculant, such as lignosulfonate, exhibit either high viscosity or product instability. Conventional suspensions that comprise an expansion agent and an oil based carrier fluid result in undesirable gelation when added to a cement slurry.

The liquid additive composition as disclosed herein advantageously contain a deflocculant, such as lignosulfonate, and optionally a surfactant, such as an alcohol alkoxylate surfactant (e.g., alcohol ethoxylate surfactant). When the deflocculant is not included in the liquid additive composition, the suspension of particulate material in organic carrier fluid may suffer from gelation, and thus its ability to free flow can be reduced. Consequently, wellbore servicing operations may be significantly complicated, and/or the suspension of particulate material in organic carrier fluid may be rendered unusable in the absence of the deflocculant. Combination of the deflocculant (e.g., lignosulfonate) with an ethylene oxide-based carrier fluid (e.g., an organic carried fluid as disclosed herein, such as MEG) may advantageously prevent gelation when the liquid additive composition is added to a cement slurry. The concentration of deflocculant alone, or in combination with optional viscosifiers (e.g., diutan alone or in combination with amorphous silica (e.g., precipitated silica)) in the liquid additive composition can be selected to advantageously control rheological parameters, such as yield point and plastic viscosity. In an aspect, the liquid additive composition as disclosed herein advantageously prevents the particulate material (e.g., MgO) from hydrating or reducing the hydration rate (e.g., restricts or retards hydration) of the particulate material (e.g., MgO). In an aspect, the liquid additive composition as disclosed herein advantageously provides an improved (e.g., extended) shelf-life for the liquid additive composition (e.g., MgO glycol suspension), for example relative to same liquid additive composition absent the deflocculant. For example, the liquid additive composition can provide a stable suspension of the particulate material (e.g., a shelf-life stability) of equal to or greater than 1, 3, 6, 9, or 12 months from the date of mixing of the components to form the liquid additive composition. Furthermore, liquid additive compositions (e.g., calcined MgO suspensions in glycol based fluids) that exhibit flocculation and were not originally formulated with deflocculation additives (i.e., that do not comprise the deflocculant of this disclosure) can be recovered to a mixable, pumpable, and deliverable fluid state by "post-adding" the deflocculants of the invention.

In embodiments, the liquid additive composition and/or the wellbore servicing fluids of the present disclosure comprising same may exclude a biocide resulting in a reduced risk to organisms in surrounding environment. In embodiments, components of the liquid additive composition and/or a wellbore servicing fluid comprising the liquid additive composition can comprise components deemed environment-friendly and on the PLONOR list, thus the liquid additive composition and/or the wellbore servicing fluid disclosed herein can, in embodiments, be used in offshore areas with relatively strict environmental protection regulations.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Effect of the Addition of Lignosulfonate to MgO Suspension on Rheology of the Suspension, for Initial and Aged Samples A liquid additive compositions absent the deflocculant (Comparative Liquid Additive Composition 1) was prepared on Date 1. The Comparative Liquid Additive Composition 1 comprised 40 wt. % calcined magnesium oxide (MgO), 45.6 wt. % monoethylene glycol (MEG), 11.4 wt. % polyethylene glycol (PEG) 1000 MW, 1.5 wt. % fumed silica, and 1.5 wt. % alcohol alkoxylate surfactant. Rheology was studied as per API 10B-2 to study the viscosity at 3, 6, 30, 60, 100, 200, and 300 RPM (up and down for all readings except for 300 RPM, which only has one viscosity reading), and the 10 s and 10 min gels were determined. On Date 2 rheology of Comparative Liquid Additive Composition 1 was again studied. The dial readings were measured on the way up from 3 RPM to 300 RPM, and on the way back down from 300 RPM to 3 RPM, and thus there are up and down readings for all RPM values, except for 300 RPM. After taking the rheology measurements on Date 2, HR®-5 lignosulfonate deflocculant was added to samples of the Comparative Liquid Additive Composition 1, to make a Liquid Additive Composition 1 of this disclosure comprising 2 lb/barrel deflocculant and Liquid Additive Composition 2 of this disclosure comprising 1 lb/bbl of the deflocculant. Liquid Additive Composition 2 was formed via dilution of Liquid Additive Sample 1 from 2 lb/bbl deflocculant to 1 lb/bbl deflocculant. The rheology test as per API 10B-2 was repeated for the Liquid Additive Compositions 1 and 2 of this disclosure, and the results are presented in Table 1. After two months (e.g., on Date 2+2 Months), Liquid Additive Composition 2 was again subjected to the rheology testing as per API 10B-2, and the results are also included in Table 1.

In all cases, the suspensions in Table 1 were prepared by adding the glycol to a mixing vessel and applying shear. The silica was then blended into the glycol followed by addition of MgO powder. The alcohol ethoxylate surfactant was added to the suspensions. Lastly, for Liquid Additive Compositions 1 and 2 according to this disclosure, the deflocculant was added to the suspensions, which were re-mixed/homogenized.

Date 2 after addition of the deflocculant) and aged (i.e., on Date 2+2 Months) showed good rheology initially and after aging, respectively, indicating low risk for sedimentation and gelation over time.

The liquid additive composition of this disclosure provides sufficient yield point (e.g., at low RPM readings (e.g., 3 RPM, 6 RPM), or no shear) such that the particulate can be maintained in suspension when the liquid additive composition is quiescent (e.g., during storage or transport), yet provides reduced viscosity at higher RPM levels (e.g., greater than or equal to about 30, 60, 100, 200, 300 RPM), exhibiting shear thinning, exhibiting lower viscosity at higher RPMs, such that pumpability of the Liquid Additive Composition of this disclosure can be facilitated relative to that a Comparative Liquid Additive Composition absent the deflocculant. Thus, the viscosity at lower RPM readings (e.g., 3 RPM, 6 RPM) and/or the yield points of the Liquid Additive Compositions of this disclosure comprising the deflocculant can be similar to (e.g., within 5, 10, 15, or 20%) those of a Comparative Liquid Additive Composition absent the deflocculant, while the viscosity of the Liquid Additive

TABLE 1*

Rheology Test Results from Example 1

| | Date | | | | |
|---|---|---|---|---|---|
| | Date 1 | Date 2 Without Deflocculant Addition | Date 2 After Deflocculant Addition Composition | Date 2 After Deflocculant Addition | Date 2 + 2 Months |
| | Comparative Liquid Additive Composition 1 | Comparative Liquid Additive Composition 1 | Liquid Additive Composition 1 | Liquid Additive Composition 2 | Liquid Additive Composition 2 |
| HR-5, lb/bbl | 0 | 0 | 2 | 1 | 1 |
| 3 RPM (Up/Down) | 10.4/10.3 | 8.2/6.8 | 2.5/2.8 | 9.4/7.0 | 5.7/4.7 |
| 6 RPM (Up/Down) | 15.2/14.7 | 12.1/10.4 | 4.8/4.9 | 13.8/9.0 | 9.0/7.5 |
| 30 RPM (Up/Down) | 44.0/39.3 | 39.5/33.9 | 22.7/22.3 | 35.5/29.6 | 32.0/28.9 |
| 60 RPM (Up/Down) | 77.2/69.2 | 72.3/62.8 | 45.2/44.0 | 58.7/53.3 | 59.7/54.5 |
| 100 RPM (Up/Down) | 115.9/106.6 | 112.5/100.2 | 73.9/73.9 | 90.0/83.9 | 94.1/88.1 |
| 200 RPM (Up/Down) | 206.6/196.2 | 205.2/193.1 | 147.6/148.1 | 165.2/156.9 | 178/173.4 |
| 300 RPM | 284.6 | 283.5 | 221.8 | 238.4 | 257.1 |
| 10 s gel | 11.2 | | | 6.7 | 4.9 |
| 10 min gel | 14.2 | | | 8.2 | 11.5 |
| Plastic Viscosity, cP | 323 | 309 | 221 | 247 | 268 |
| Yield Point, $lb_f/100\ ft^2$ | 6.1 | 3.8 | 0.5 | 5.4 | 2.2 |

*Data collected on RheoVADR viscometer with R1-B1-F1 configuration.

For particulate suspension, it can desirable for the ratio of the dial reading at 3 RPM to dial reading at 6 RPM to be greater than 0.5 (e.g., about 0.6, 0.7, 0.8, or more; closer to 1), such that the yield point of the suspension is sufficient to maintain suspension of the particulate when the suspension is quiescent (e.g., extrapolates to sufficient yield point at no shear). The viscosities for Liquid Additive Composition 1 at 3 RPM and 6 RPM were low, and thus Liquid Additive Composition 2 comprising half the deflocculant as Liquid Additive Composition 1 was made and rheology tested on Date 2. Liquid Additive Composition 2 initially (i.e., on Compositions of this disclosure comprising the deflocculant at higher RPM readings (e.g., greater than or equal to about 30, 60, 100, 200, 300 RPM) can be (e.g., at least 5, 10, 20, or 30%) less than those of a Comparative Liquid Additive Composition absent the deflocculant.

Example 2

Pilot Scale Re-Homogenization

Four 330 gallon totes comprising 250 gallons of a Liquid Additive Composition absent deflocculant were formed, as described for Comparative Liquid Additive 1 and 2 of Example 1. The totes were formed on Date 1 (Oct. 26, 2023); on Date 2 (Nov. 14, 2024) which was 19 days after Date 1, a heating jacket was applied only to Tote 1; on Date 3 (Feb. 8, 2024), which was almost 3 months after Date 2, the heating jacket on Tote 1 was removed, the material was recirculated, and an AMP test performed; on Date 4 (Mar. 28, 2024), seven weeks after Date 3, the totes were transferred, flocculants of Tote 1 were homogenized using a hand mortar mixer with an extended shaft and a modified paddle, 0.5 lb/bbl of deflocculant (HR®-5) was added by sandwich method, and a second tote transfer was effected; on Date 5 (May 15, 2024), almost 7 weeks after Date 4, the Liquid Additive Composition of Tote 1 was again rheology tested (as per API 10B-2, as described in Example 1) and found to pour easily, with no visible gelling, and close rheological measurements were obtained between the top and bottom samples. The results are provided in Table 2. A sandwich addition method can comprise a tote transfer sequence via: one-third (⅓) of the tote contents, followed by half (½) of the additive (deflocculant), then another third (⅓) of the tote contents followed by the other half (½) of the additive (deflocculant) and the last third (⅓) of the tote contents to complete the total volume transfer. The combined mix can then be thoroughly blended.

TABLE 2

| Results from Example 2 | | | | |
|---|---|---|---|---|
| Pre/Post Circulation | Pre-Lignosulfonate Addition (gel) (Comparative Liquid Additive Composition) | Post-Lignosulfonate Addition (Liquid Additive Composition of this Disclosure) | Post Lignosulfonate Addition (Liquid Additive Composition of this Disclosure) | Post Lignosulfonate Addition (Liquid Additive Composition of this Disclosure) |
| Sample Date | Date 4 (Mar. 28 2024) | Date 4 (Mar. 28 2024) | Date 5 (May 15, 2024) | Date 5 (May 15, 2024) |
| Sample Location | N/A | N/A | Top | Bottom |
| T (° F.) | 70 | 72 | 70 | 70 |
| Rheology (R1-B1-F1) | | | | |
| 3 RPM | 33.4 | 19 | 20 | 21 |
| 6 RPM | 50.5 | 28.5 | 31 | 31 |
| 100 RPM | — | 263 | 261 | 253 |
| 200 RPM | — | — | 485 | 466 |
| 300 RPM | — | — | — | — |

As seen in the results provided in Table 2, pre-lignosulfonate addition, the higher RPM rheologies (of the Comparative Liquid Additive Composition absent the deflocculant) could not even be measured. Post lignosulfonate addition, on Date 5, the top and bottom samples exhibited nearly identical viscosities, indicating a homogeneous and stable suspension provided by the Liquid Additive Composition of this disclosure comprising the deflocculant.

Figure 6A:
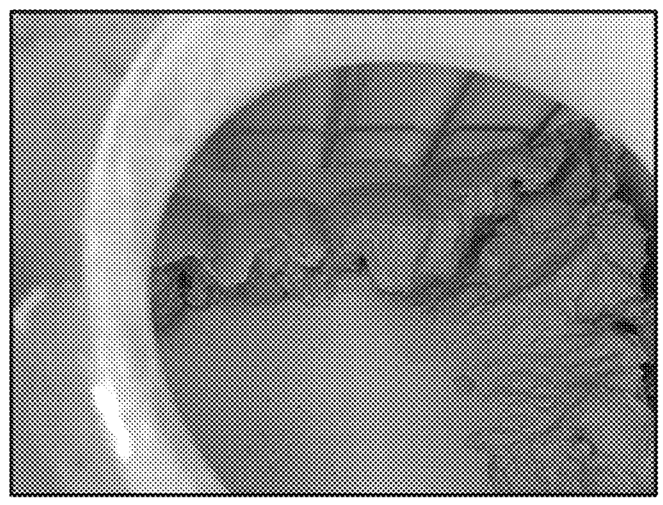
FIG. 6A, FIG. 6B, and FIG. 6C display photos of liquid additive composition samples from Example 2.
Figure 6B:
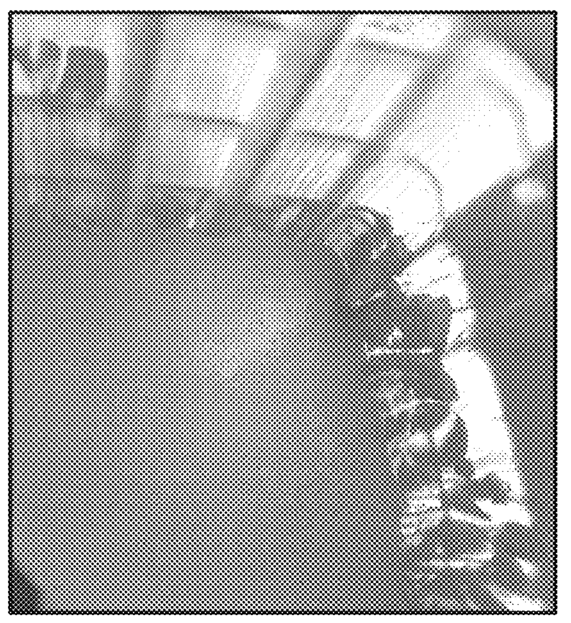
Figure 6B:
Figure 6C:
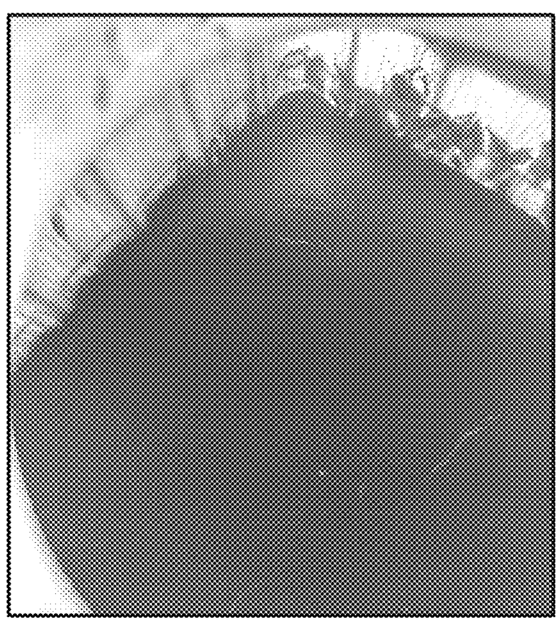

FIG. 6A is a picture of Tote 1 on Date 3, in which the agglomerated material is clearly visible; FIG. 6B is a picture of Tote 1 on Date 3, after mixing the agglomerate into the suspension via hand mortar and modified paddle and prior to the addition of deflocculant; FIG. 6C is a picture of Tote 1, after the addition of the deflocculant prior to homogenization. As can be seen in FIG. 6B, the mixing absent the deflocculant improved (reduced) the amount of agglomerate relative to that seen in FIG. 6A, but did not eliminate it. As seen in FIG. 6C, the addition of the deflocculant and additional unexpectedly removed the agglomerate.

Figure 7A:
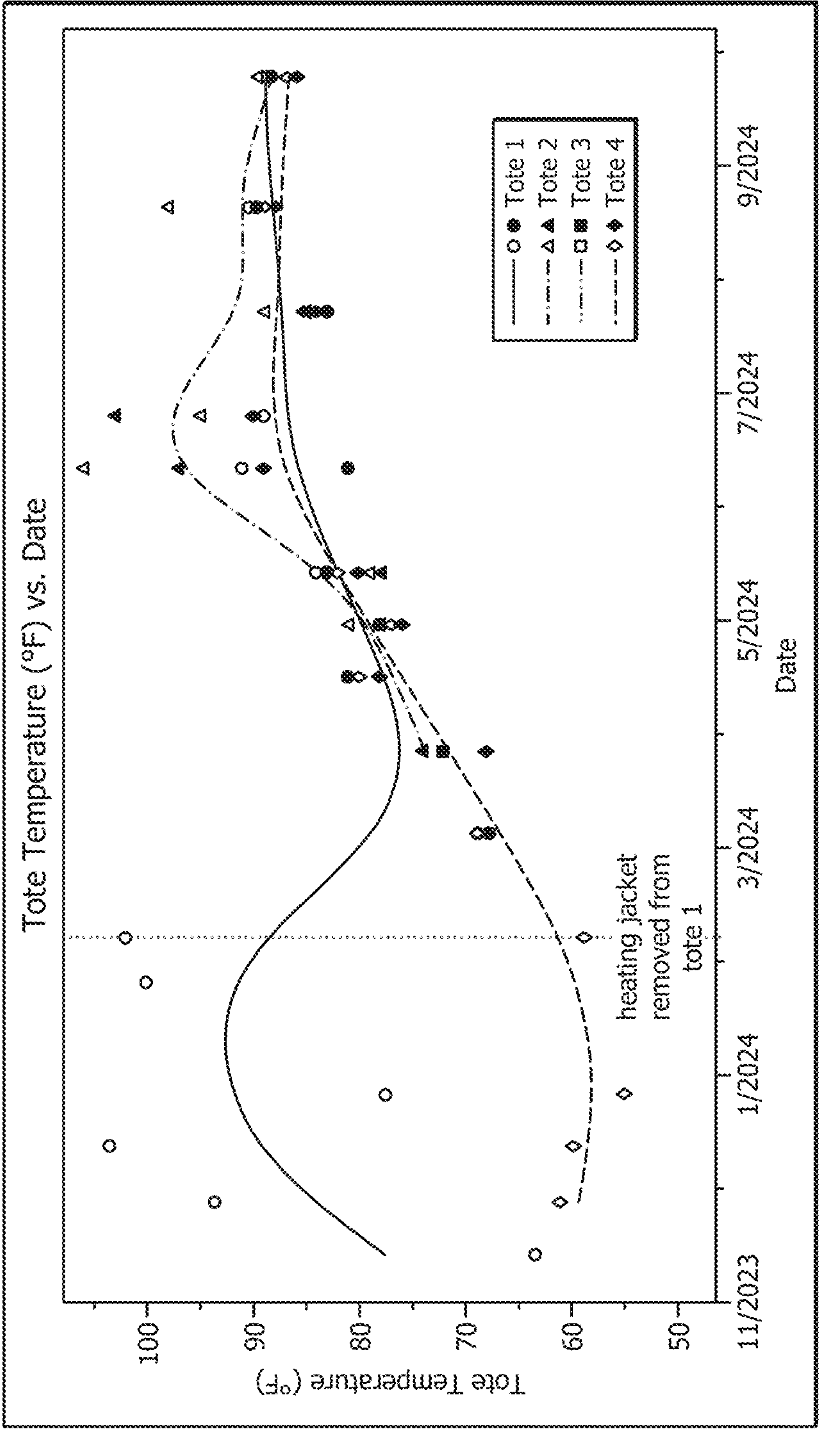
FIG. 7A is a plot of tote temperature vs. date for the four totes of Example 2.
Figure 7B:
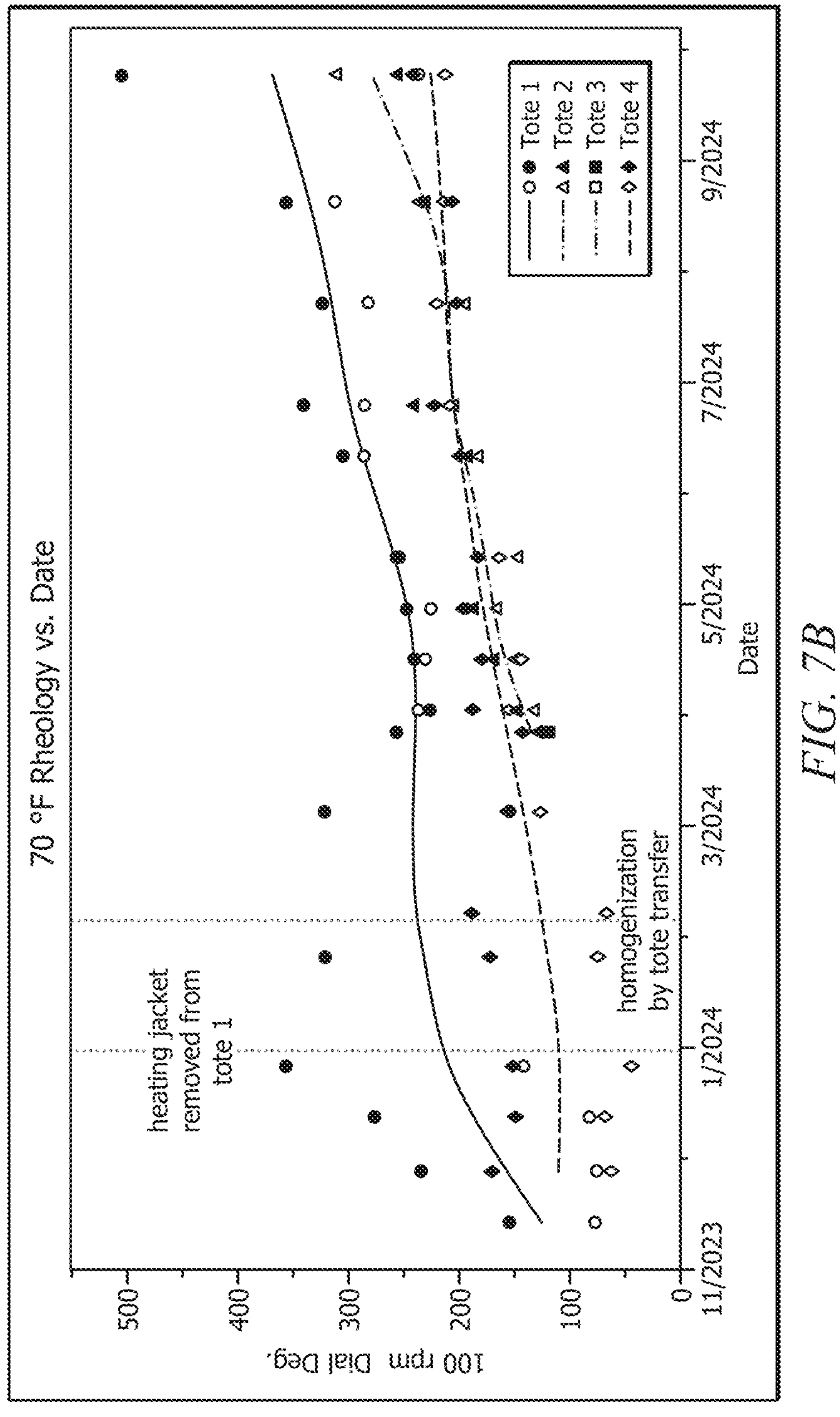
FIG. 7B is a plot of the rheology reading at 100 RPM vs. the date for the four totes of Example 2.

FIG. 7A is a plot of tote temperature vs. date for the four totes, including Tote 1, which had the heating jacket until Date 3 (Feb. 8, 2024), indicated with the vertical line of FIG. 7A and the left-most vertical line of FIG. 7B. FIG. 7B is a plot of the dial deg. rheology reading at 100 RPM vs. the date for the four totes; the left-most vertical line indicates Date 3, when the heating jacket was removed from Tote 1, and the right-most vertical line indicates Date 4, when the deflocculant was added to Tote 1. The open circles indicate the top sample and the closed circles indicate the bottom samples for each tote. As can be seen in FIG. 7A, once the heater was removed from Tote 1 on Date 3, the temperature of Tote 1 aligned with the temperature readings of Totes 2-4. As seen in FIG. 7B, after removal of the heater from Tote 1 on Date 3 and addition of the deflocculant to Tote 1 on Date 4, the rheology of the top and bottom samples of Tote 1 became more homogeneous (e.g., less distance between the open and closed circles representing Tote 1), with no sedimentation detected and liquidity of the system maintained.

ADDITIONAL DISCLOSURE

A first embodiment which is a liquid additive composition comprising a particulate material, an organic carrier fluid, and a deflocculant; wherein the particulate material is substantially insoluble in the organic carrier fluid; and wherein the organic carrier fluid comprises a glycol and/or a glycol ether.

A second embodiment which is the liquid additive composition of the first embodiment, wherein the liquid additive composition has a reduced viscosity relative to a viscosity of a same liquid additive absent the deflocculant.

A third embodiment which is the liquid additive composition of the first or the second embodiment, wherein the deflocculant is selected from lignosulfonates, sulfonated naphthalene condensates, sulfonated acetone formaldehyde condensates (SAFCs), polyphosphates, polycarboxylate ethers, aminophosphonates, aminophosphonic acids, or combinations thereof.

A fourth embodiment which is the liquid additive composition of any one of the first to third embodiments, wherein the deflocculant is present in the liquid additive composition in an amount of from about greater than 0 (e.g., 0.01) pounds per barrel to about 5 pounds per barrel (e.g., from about 0.01 to about 1 weight percent (wt. %)), based on a total weight of the liquid additive composition.

A fifth embodiment, which is the liquid additive composition of any one of the first to fourth embodiments further comprising a viscosifier, wherein the viscosifier is optionally selected from biopolymer gums, guar gums, xanthan gums, welan gums, diutans, celluloses, hydroxyethyl celluloses (HECs), modified celluloses, diatomaceous earths, starches, modified and/or crosslinked starches, viscoelastic surfactants (VESs), derivatives thereof, or combinations thereof.

A sixth embodiment which is the liquid additive composition of any one of the first to fifth embodiments, wherein the viscosifier comprises diutan.

A seventh embodiment which is the liquid additive composition of any one of the fifth to sixth embodiments, wherein the viscosifier further comprises amorphous silica.

An eighth embodiment which is the liquid additive composition of the seventh embodiment, wherein the amorphous silica comprises non-mined amorphous silica, precipitated silica, fumed silica, silica fume, porous silica, micro-sized silica, nano-sized silica, or a combination thereof.

A ninth embodiment which is the liquid additive composition of any of the fifth through eighth embodiments, wherein the viscosifier is present in the liquid additive composition in an amount of from about 0.01 wt. % to about 10 wt. %, based on a total weight of the liquid additive composition.

A tenth embodiment which is the liquid additive composition of any of the first through ninth embodiments further comprising a surfactant, wherein the surfactant comprises an alcohol alkoxylate surfactant.

An eleventh embodiment which is the liquid additive composition of the tenth embodiment, wherein surfactant the is characterized by the general formula $R^1(OR^2)_nOH$; wherein n is from about 1 to about 30; wherein $R^1$ is an alkyl group having from about 3 to about 25 carbon atoms; wherein $R^1$ is characterized by a degree of branching of from 0 to about 5; and wherein $R^2$ is an alkylene group having from about 2 to about 5 carbon atoms.

A twelfth embodiment which is the liquid additive composition of the eleventh embodiment, wherein $R^2$ is ethylene and/or propylene.

A thirteenth embodiment which is the liquid additive composition of any of the tenth through twelfth embodiments, wherein the surfactant is present in the liquid additive composition in an amount of from about 0.1 wt. % to about 10 wt. %, based on a total weight of the liquid additive composition.

A fourteenth embodiment which is the liquid additive composition of any of the first through thirteenth embodiments, wherein the particulate material comprises a water-interactive material, and wherein the water-interactive material comprises an expansion agent, inorganic oxides, alkali metal oxides, alkaline earth metal oxides, magnesium oxide, non-calcined magnesium oxide, calcined magnesium oxide, lightly burned magnesium oxide, hard burned magnesium oxide, dead burned magnesium oxide, calcium oxide, metal powders, aluminum powder, magnesium powder, iron powder, zinc powder, a gypsum blend, inorganic silicates, magnesium iron silicate, olivine; an ettringite precursor, ettringite, calcium aluminum sulfate, hydrous calcium aluminum sulfate, a calcium aluminate mixture, a calcium aluminate cement (CAC) and calcium sulfate mixture, a gypsum blend, a calcium aluminate/calcium sulfate blend; a viscosifying clay, bentonite, sepiolite, hectorite; a delayed viscosifier, crosslinked guar, crosslinked vinyl alcohols, crosslinked acrylamide polymers; a fluid loss agent, an acrylic-based polymer, a polyacrylate, an acrylamide-based polymer, a polyacrylamide, an acrylamide copolymer, an acrylic acid copolymer, a polymer of acrylamide-tertiary-butyl sulfonate (ATBS), an ATBS/acrylamide copolymer, 2-acrylamido-2-methylpropane sulfonic acid/acrylamide copolymers, 2-acrylamido-2-methylpropane sulfonic acid/N,N-dimethylacrylamide copolymers, vinylpyrrolidone/2-acrylamido-2-methylpropane sulfonic acid/acrylamide terpolymers, acrylamide/t-butyl acrylate/N-vinylpyrrolidone terpolymers, acrylamide/t-butyl acrylate/2-acrylamido-2-methylpropane sulfonic acid terpolymers, 2-acrylamido-2-methylpropane sulfonic acid/N-N-dimethylacrylamide/acrylamide terpolymers, acrylamide/t-butyl acrylate/N-vinylpyrrolidone/2-acrylamido-2-methylpropane sulfonic acid tetrapolymers, acrylamide/t-butyl acrylate copolymers, poly(2-hydroxyethyl methacrylate), poly(2-hydroxypropyl methacrylate), derivatives thereof; or combinations thereof.

A fifteenth embodiment which is the liquid additive composition of any of the first through fourteenth embodiments, wherein the particulate material comprises a water-insoluble material, wherein the water-insoluble material comprises pozzolana cement; sand; a weighting agent, an iron oxide, hematite, a manganese oxide, hausmannite, a titanium-iron oxide, ilmenite; a fiber, a carbon fiber, an acrylonitrile fiber, a polypropylene fiber, a glass fiber, a rubber fiber; a rubber particle; a hollow glass sphere; a hollow pozzolanic sphere; a glass bubble; a glass ball; a ceramic ball; graphite; pozzolan; pumice; trass; clay; calcined clay; or combinations thereof.

A sixteenth embodiment which is the liquid additive composition of any of the first through thirteenth embodiments, wherein the particulate material is characterized by a particle size of from about 10 nm to about 1,000 μm.

A seventeenth embodiment which is the liquid additive composition of any of the first through sixteenth embodiments, wherein the particulate material is characterized by a shape selected from the group consisting of cylindrical, discoidal, spherical, tabular, ellipsoidal, equant, irregular, cubic, acicular, angular, and combinations thereof.

An eighteenth embodiment which is the liquid additive composition of any of the first through seventeenth embodiments, wherein the particulate material is present in the liquid additive composition in an amount of from about 10 wt. % to about 80 wt. %, based on a total weight of the liquid additive composition.

A nineteenth embodiment which is the liquid additive composition of any of the first through eighteenth embodiments, wherein the glycol comprises an alkylene glycol, monoethylene glycol, propylene glycol, butylene glycol, polyalkylene glycol, polyethylene glycol, polypropylene glycol, polybutylene glycol, or combinations thereof; and wherein the glycol ether comprises ethylene glycol monomethyl ether, ethylene glycol monoethyl ether, propylene glycol monomethyl ether, propylene glycol monoethyl ether, butylene glycol monomethyl ether, butylene glycol monoethyl ether, or combinations thereof.

A twentieth embodiment which is the liquid additive composition of any of the first through nineteenth embodiments, wherein the organic carrier fluid is present in the liquid additive composition in an amount of from about 20 wt. % to about 90 wt. %, based on a total weight of the liquid additive composition.

A twenty first embodiment which is the liquid additive composition of the first embodiment, wherein the particulate material comprises magnesium oxide, non-calcined magnesium oxide, calcined magnesium oxide, lightly burned magnesium oxide, hard burned magnesium oxide, dead burned magnesium oxide, or combinations thereof; wherein the viscosifier comprises amorphous silica and diutan; wherein the organic carrier fluid comprises monoethylene glycol; and wherein the deflocculant is selected from lignosulfonates, sulfonated naphthalene condensates, sulfonated acetone formaldehyde condensates (SAFCs), polyphosphates, aminophosphonates, aminophosphonic acids, or combinations thereof.

A twenty second embodiment which is the liquid additive composition of the twenty first embodiment, further comprising an alcohol ethoxylate surfactant characterized by the general formula $R^1$ $(OCH_2CH_2)_nOH$, wherein n is about 5, wherein $R^1$ is an alkyl group having about 10 carbon atoms, and wherein $R^1$ is characterized by a degree of branching of about 1.

A twenty third embodiment which is the liquid additive composition of the twenty first or twenty second embodiment comprising (i) from about 40 wt. % to about 75 wt. % particulate material (e.g., calcined MgO), (ii) from about 25 wt. % to about 60 wt. % organic carrier fluid (e.g., ethylene glycol), and (iii) from about greater than 0, 0.01, 0.05, 0.1, 0,2, 0.3, 0.4, 0.5, 0.6, 0.7, 0.8, 0.9, or 1 to about 5, 4, 3, 2, 1, or 0.5 pounds per barrel (lb/bbl) deflocculant; based on a total weight of the liquid additive composition.

A twenty fourth embodiment which is the liquid additive composition of any one of the twenty first through twenty third embodiments comprising (iv) from about 0.25 wt. % to about 5 wt. % amorphous silica viscosifier, (v) from equal to or greater than about 0 wt. % to about 0.1 wt. % diutan viscosifier, or a combination thereof.

A twenty fifth embodiment which is the liquid additive composition of any of the first through twenty fourth embodiments, wherein the liquid additive composition has (A1) an initial plastic viscosity and/or aged plastic viscosity of from about 200 cP to about 2,500 cP; and/or (A2) an initial yield point and/or aged yield point of from about 1 lb/100 $ft^2$ to about 30 lb/100 $ft^2$; wherein the initial plastic viscosity and the aged plastic viscosity are measured under the same conditions at the time of preparing the composition and at a time later than the time of preparing the composition, respectively; and wherein the initial yield point and the aged yield point are measured under the same conditions at the time of preparing the composition and at a time later than the time of preparing the composition, respectively.

A twenty-sixth embodiment which is the liquid additive composition of the twenty fifth embodiment, wherein the initial plastic viscosity and the aged plastic viscosity are calculated using a Herschel-Bulkley model; and wherein the initial yield point and the aged yield point are calculated using a Herschel-Bulkley model.

A twenty seventh embodiment which is a wellbore servicing fluid comprising the liquid additive composition of any of the first through twenty-sixth embodiments, water, a cement blend, and optionally one or more supplemental additives, weighting agents or weight-reducing agents.

A twenty eighth embodiment with is the wellbore servicing fluid of the twenty seventh embodiments, wherein the liquid additive composition is present in the wellbore servicing fluid in an amount of from about 0.1 wt. % to about 60 wt. %, based on a total weight of the wellbore servicing fluid.

A twenty ninth embodiment which is the wellbore servicing fluid of the twenty seventh or twenty eighth embodiments, wherein the cement blend is present in the wellbore servicing fluid in an amount ranging from about 20 wt. % to about 90 wt. %, based on a total weight of the wellbore servicing fluid.

A thirtieth embodiment which is a method comprising: (a) contacting at a location proximate a wellsite the liquid additive composition of any of the first through twenty sixth embodiments, water, a cement blend, and optionally one or more supplemental additives to form a wellbore servicing fluid; and (b) placing the wellbore servicing fluid in a wellbore penetrating a subterranean formation.

A thirty first embodiment which is the method of the thirtieth embodiment, wherein the wellbore servicing fluid is a pumpable cementitious fluid; wherein the contacting comprises (i) contacting the liquid additive composition with water to form a mixture, and (ii) contacting the mixture with a cement blend to form the wellbore servicing fluid; wherein the one or more supplemental additives are optionally added to the mixture prior to contacting the mixture with the cement blend; and wherein the wellbore servicing fluid is allowed to set in the wellbore.

A thirty second embodiment which is a method comprising: (a) contacting a particulate material, an organic carrier fluid, a deflocculant, and optionally a viscosifier, a surfactant, or both, to form a mixture; and (b) agitating the mixture to form the liquid additive composition of any of the first through twenty sixth embodiments.

A thirty third embodiment which is the method of the thirty second embodiment, wherein agitating comprises shearing, stirring, shaking, blending, mixing, gas bubbling, pumping, or combinations thereof.

A thirty fourth embodiment which is the method of any of the thirty second or thirty third embodiment further comprising contacting the liquid additive composition with water, a cement blend and optionally one or more supplemental additives, weighting agents or weight-reducing agents to form the wellbore servicing fluid of any of the twenty seventh through the twenty ninth embodiments.

A thirty fifth embodiment which is a method comprising: (a) contacting the liquid additive composition of any of first through twenty sixth embodiments, water, cement blend, and optionally one or more supplemental additives to form the wellbore servicing fluid of any of twenty seventh through the twenty ninth embodiments at a location proximate a wellsite; and (b) placing the wellbore servicing fluid in a wellbore penetrating a subterranean formation.

A thirty sixth embodiment which is the method of the thirty fifth embodiment, further comprising transporting the liquid additive composition of any of first through twenty sixth embodiments, water, cement blend, and optionally one or more supplemental additives to the location proximate a wellsite.

A thirty seventh embodiment which is the method of the thirtieth sixth embodiment, wherein the liquid additive composition of any of first through twenty sixth embodiments is combined with one or more dry components, for example without limitation a dry cement blend, one or more dry supplemental additives, or any combination thereof at the location proximate a wellsite (e.g., an offshore platform). The dry cement blend and/or the dry supplemental additives may be in the form of a dry powder or dry granular material, and the dry components can be mixed with the liquid additive composition and water to form the wellbore servicing fluid as described herein.

A thirty eighth embodiment which is the method of any of the thirty fifth through thirty seventh embodiments, wherein the wellsite comprises an offshore platform, a floating vessel, or combinations thereof; and wherein the wellbore is offshore.

A thirty ninth embodiment which is the method of any of the thirty fifth through thirty eighth embodiments, wherein the wellbore servicing fluid is a cementitious fluid; wherein the contacting comprises (i) contacting the liquid additive composition with water to form a mixture, and (ii) contacting the mixture with a cement blend to form the wellbore servicing fluid; wherein the one or more supplemental additives are optionally added to the mixture prior to contacting the mixture with the cement blend; and wherein the wellbore servicing fluid is allowed to set. In an aspect, said method of the thirty ninth embodiment is performed on an offshore platform.

A fortieth embodiment which is the method of the thirty ninth embodiment, further comprising adding a weighting agent or a weight-reducing agent to the wellbore servicing fluid prior to placing the wellbore servicing fluid in the wellbore; wherein the weighting agent or the weight-reducing agent is added to the mixture prior to or concurrent with contacting the mixture with the cement blend.

A forty first embodiment which is the method of any one of the thirtieth to fortieth embodiments, wherein one or more of the components of the liquid additive composition and/or the wellbore servicing fluid are PLONOR (Pose Little or No Risk to the Environment) materials.

A forty second embodiment, which is a method comprising: deflocculating a flocculated liquid additive composition, wherein the liquid additive composition comprises an organic carrier fluid and agglomerates of a particulate material; wherein the particulate material is substantially insoluble in the organic carrier fluid; optionally wherein the particulate material comprises a water-interactive material and/or a water-insoluble material; and wherein the organic carrier fluid comprises a glycol and/or a glycol ether, by: adding a deflocculant to the flocculated liquid additive composition to provide a deflocculated liquid additive composition, wherein the deflocculated liquid additive composition comprises a reduced amount of the agglomerates relative to the flocculated liquid additive composition.

A forty third embodiment, which is the method of the forty second embodiment, wherein adding the deflocculant to the flocculated liquid additive composition further comprises subjecting the flocculated liquid additive composition to high shear.

A forty fourth embodiment, which is the method of the forty third embodiment, wherein subjecting the flocculated liquid additive composition to high shear further comprises passing through a centrifugal pump or another high shear (e.g., rotor/stator) mixer.

A forty fifth embodiment, which is the method of any one of the forty second to forty fourth embodiments, wherein the deflocculant is selected from lignosulfonates, sulfonated naphthalene condensates, sulfonated acetone formaldehyde condensates (SAFCs), polyphosphates, aminophosphonates, aminophosphonic acids, or combinations thereof.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A liquid additive composition comprising a particulate material, an organic carrier fluid, and a deflocculant; wherein the particulate material is substantially insoluble in the organic carrier fluid and suspended therein; wherein the organic carrier fluid comprises a glycol and/or a glycol ether, wherein the deflocculant is selected from lignosulfonates, sulfonated naphthalene condensates, sulfonated acetone formaldehyde condensates (SAFCs), polyphosphates, aminophosphonates, aminophosphonic acids, polycarboxylate ethers or combinations thereof, wherein the liquid additive composition is non-cementitious, and wherein the liquid additive composition is shelf stable for greater than seven days, as indicated by a lack of agglomeration.

2. The liquid additive composition of claim 1, wherein the liquid additive composition has a reduced viscosity relative to a viscosity of a same liquid additive absent the deflocculant.

3. The liquid additive composition of claim 1, wherein the deflocculant is selected from lignosulfonates.

4. The liquid additive composition of claim 1, further comprising a viscosifier, wherein the viscosifier is selected from biopolymer gum, guar gum, xanthan gum, welan gum, diutan, cellulose, hydroxyethyl cellulose (HEC), modified cellulose, diatomaceous earth, starch, modified and/or cross-linked starch, viscoelastic surfactants (VES), derivatives thereof, or combinations thereof.

5. The liquid additive composition of claim 4, wherein the viscosifier comprises diutan.

6. The liquid additive composition of claim 5, wherein the viscosifier further comprises amorphous silica.

7. The liquid additive composition of claim 1, further comprising a surfactant, wherein the surfactant comprises an alcohol alkoxylate surfactant.

8. The liquid additive composition of claim 7, wherein the surfactant is characterized by the general formula $R^1(OR^2)_nOH$; wherein n is from about 1 to about 30; wherein $R^1$ is an alkyl group having from about 3 to about 25 carbon atoms; wherein $R^1$ is characterized by a degree of branching of from 0 to about 5; and wherein $R^2$ is an alkylene group having from about 2 to about 5 carbon atoms.

9. The liquid additive composition of claim 8, wherein $R^2$ is ethylene and/or propylene.

10. The liquid additive composition of claim 1, wherein the particulate material comprises a water-interactive material, wherein the water-interactive material comprises an expansion agent, inorganic oxides, alkali metal oxides, alkaline earth metal oxides, magnesium oxide, non-calcined magnesium oxide, calcined magnesium oxide, lightly burned magnesium oxide, hard burned magnesium oxide, dead burned magnesium oxide, calcium oxide, metal powders, aluminum powder, magnesium powder, iron powder, zinc powder, a gypsum blend, inorganic silicates, magnesium iron silicate, olivine; an ettringite precursor, ettringite, calcium aluminum sulfate, hydrous calcium aluminum sulfate, a calcium aluminate mixture, a calcium aluminate cement (CAC) and calcium sulfate mixture, a gypsum blend, a calcium aluminate/calcium sulfate blend; a viscosifying clay, bentonite, sepiolite, hectorite; a delayed viscosifier, crosslinked guar, crosslinked vinyl alcohols, crosslinked acrylamide polymers; a fluid loss agent, an acrylic-based polymer, a polyacrylate, an acrylamide-based polymer, a polyacrylamide, an acrylamide copolymer, an acrylic acid copolymer, a polymer of acrylamide-tertiary-butyl sulfonate (ATBS), an ATBS/acrylamide copolymer, 2-acrylamido-2-methylpropane sulfonic acid/acrylamide copolymers, 2-acrylamido-2-methylpropane sulfonic acid/N,N-dimethylacrylamide copolymers, vinylpyrrolidone/2-acrylamido-2-methylpropane sulfonic acid/acrylamide terpolymers, acrylamide/t-butyl acrylate/N-vinylpyrrolidone terpolymers, acrylamide/t-butyl acrylate/2-acrylamido-2-methylpropane sulfonic acid terpolymers, 2-acrylamido-2-methylpropane sulfonic acid/N-N-dimethylacrylamide/acrylamide terpolymers, acrylamide/t-butyl acrylate/N-vinylpyrrolidone/2-acrylamido-2-methylpropane sulfonic acid tetrapolymers, acrylamide/t-butyl acrylate copolymers, poly(2-hydroxyethyl methacrylate), poly(2-hydroxypropyl methacrylate), derivatives thereof; or combinations thereof.

11. The liquid additive composition of claim 1, wherein the particulate material comprises a water-insoluble material, wherein the water-insoluble material comprises pozzolana cement; sand; a weighting agent, an iron oxide, hematite, a manganese oxide, hausmannite, a titanium-iron oxide, ilmenite; a fiber, a carbon fiber, an acrylonitrile fiber, a polypropylene fiber, a glass fiber, a rubber fiber; a rubber particle; a hollow glass sphere; a hollow pozzolanic sphere; a glass bubble; a glass ball; a ceramic ball; graphite; pozzolan; pumice; trass; clay; calcined clay; or combinations thereof.

12. The liquid additive composition of claim 1, wherein the glycol comprises an alkylene glycol, monoethylene glycol, propylene glycol, butylene glycol, polyalkylene glycol, polyethylene glycol, polypropylene glycol, polybutylene glycol, or combinations thereof; and wherein the glycol ether comprises ethylene glycol monomethyl ether, ethylene glycol monoethyl ether, propylene glycol monomethyl ether, propylene glycol monoethyl ether, butylene glycol monomethyl ether, butylene glycol monoethyl ether, or combinations thereof.

13. The liquid additive composition of claim 1, wherein the particulate material comprises magnesium oxide, non-calcined magnesium oxide, calcined magnesium oxide, lightly burned magnesium oxide, hard burned magnesium oxide, dead burned magnesium oxide, or combinations thereof; wherein the organic carrier fluid comprises ethylene glycol.

14. A wellbore servicing fluid comprising the liquid additive composition of claim 1, water, a cement blend, and optionally one or more weighting agents, weight-reducing agents, or other additives.

15. A method comprising:

(a) contacting at a location proximate a wellsite the liquid additive composition of claim 1, water, a cement blend, and optionally one or more supplemental additives to form a wellbore servicing fluid; and (b) placing the wellbore servicing fluid in a wellbore penetrating a subterranean formation; and at least seven days prior to (a), forming the liquid additive composition of claim 1.

16. The method of claim 15, wherein the wellbore servicing fluid is a pumpable cementitious fluid; wherein the contacting comprises (i) contacting the liquid additive composition with water to form a mixture, and (ii) contacting the mixture with a cement blend to form the wellbore servicing fluid; wherein the one or more supplemental additives are optionally added to the mixture prior to contacting the mixture with the cement blend; and wherein the wellbore servicing fluid is allowed to set in the wellbore.

17. A method comprising:

deflocculating a flocculated liquid additive composition, wherein the liquid additive composition comprises an organic carrier fluid and agglomerates of a particulate material; wherein the liquid additive composition is non-cementitious, wherein the particulate material is substantially insoluble in the organic carrier fluid; optionally wherein the particulate material comprises a water-interactive material and/or a water-insoluble material; and wherein the organic carrier fluid comprises a glycol and/or a glycol ether, by:

adding a deflocculant to the flocculated liquid additive composition to provide a deflocculated liquid additive composition, wherein the deflocculated liquid additive composition comprises a reduced amount of the agglomerates relative to the flocculated liquid additive composition, wherein the deflocculant is selected from lignosulfonates, sulfonated naphthalene condensates, sulfonated acetone formaldehyde condensates (SAFCs), polyphosphates, polycarboxylate ethers, aminophosphonates, aminophosphonic acids, or combinations thereof.

18. The method of claim 17, wherein adding the deflocculant to the flocculated liquid additive composition further comprises subjecting the flocculated liquid additive composition to high shear.

19. The method of claim 18, wherein subjecting the flocculated liquid additive composition to high shear further comprises passing through a centrifugal pump or another high shear mixer.

20. The method of claim 17, wherein the deflocculant is selected from lignosulfonates.

* * * * *